June 11, 1963 — F. E. SIMPSON ETAL — 3,093,280
BAG MAKING MACHINE
Filed May 22, 1959 — 10 Sheets-Sheet 5
FIG_6
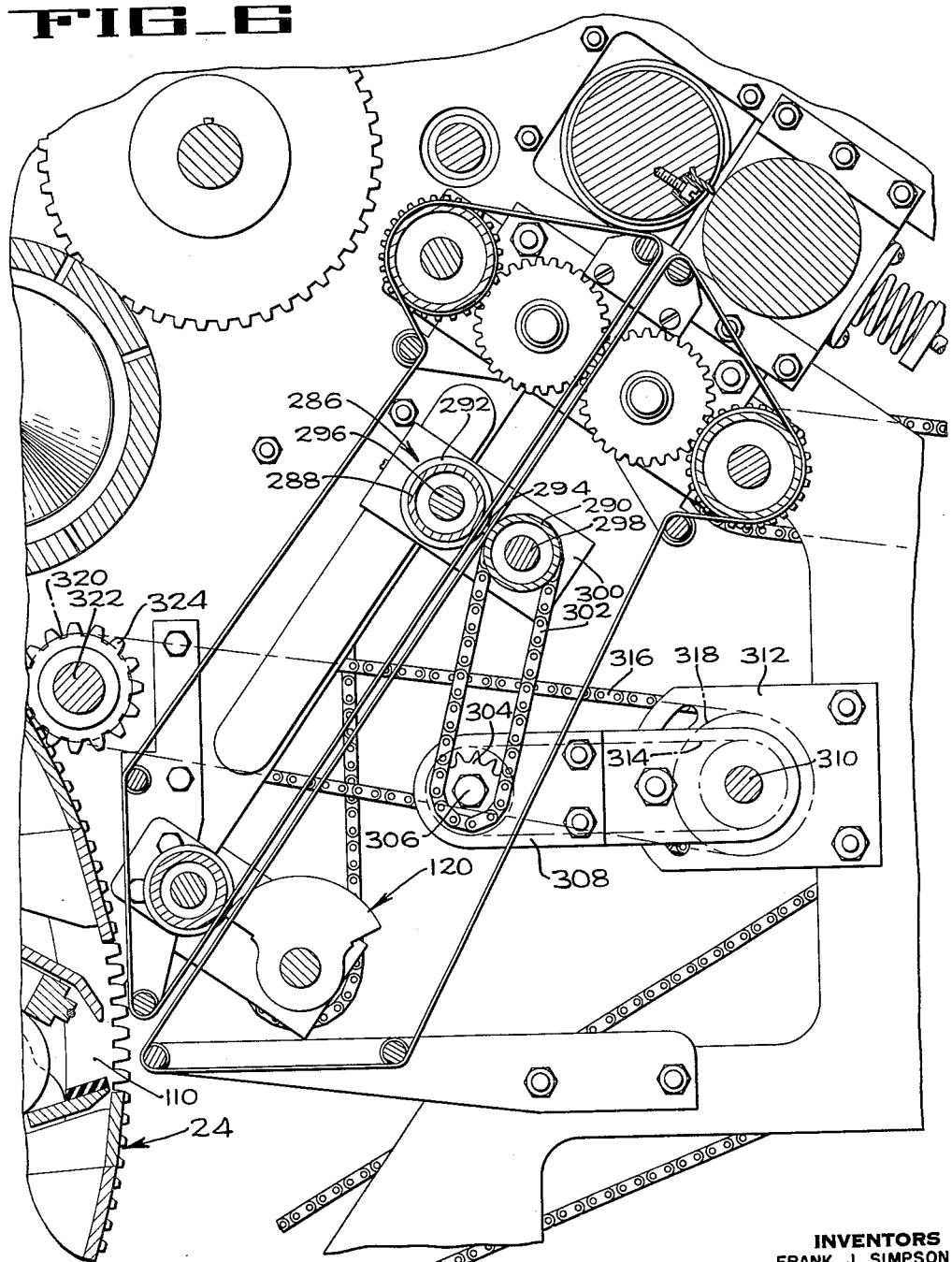
INVENTORS
FRANK J. SIMPSON
JOHN D. HOFFMAN
BY Hans G. Hoffmeister
ATTORNEY

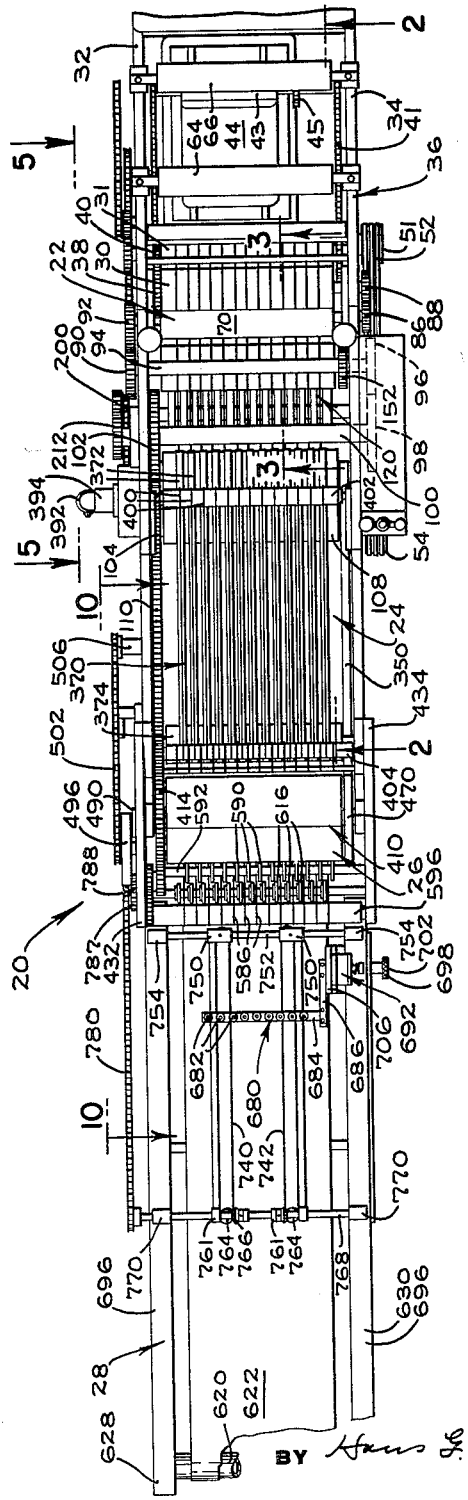

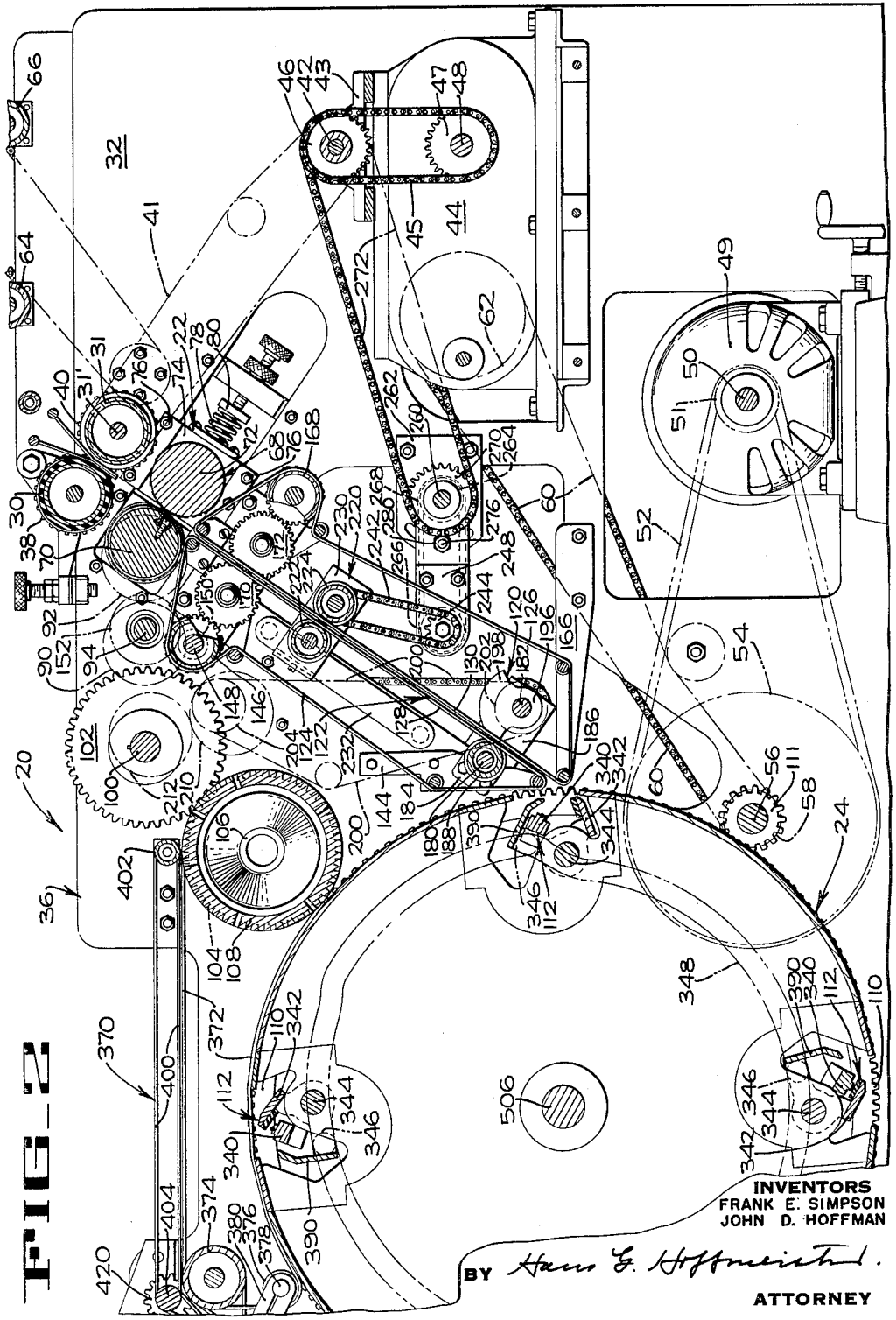

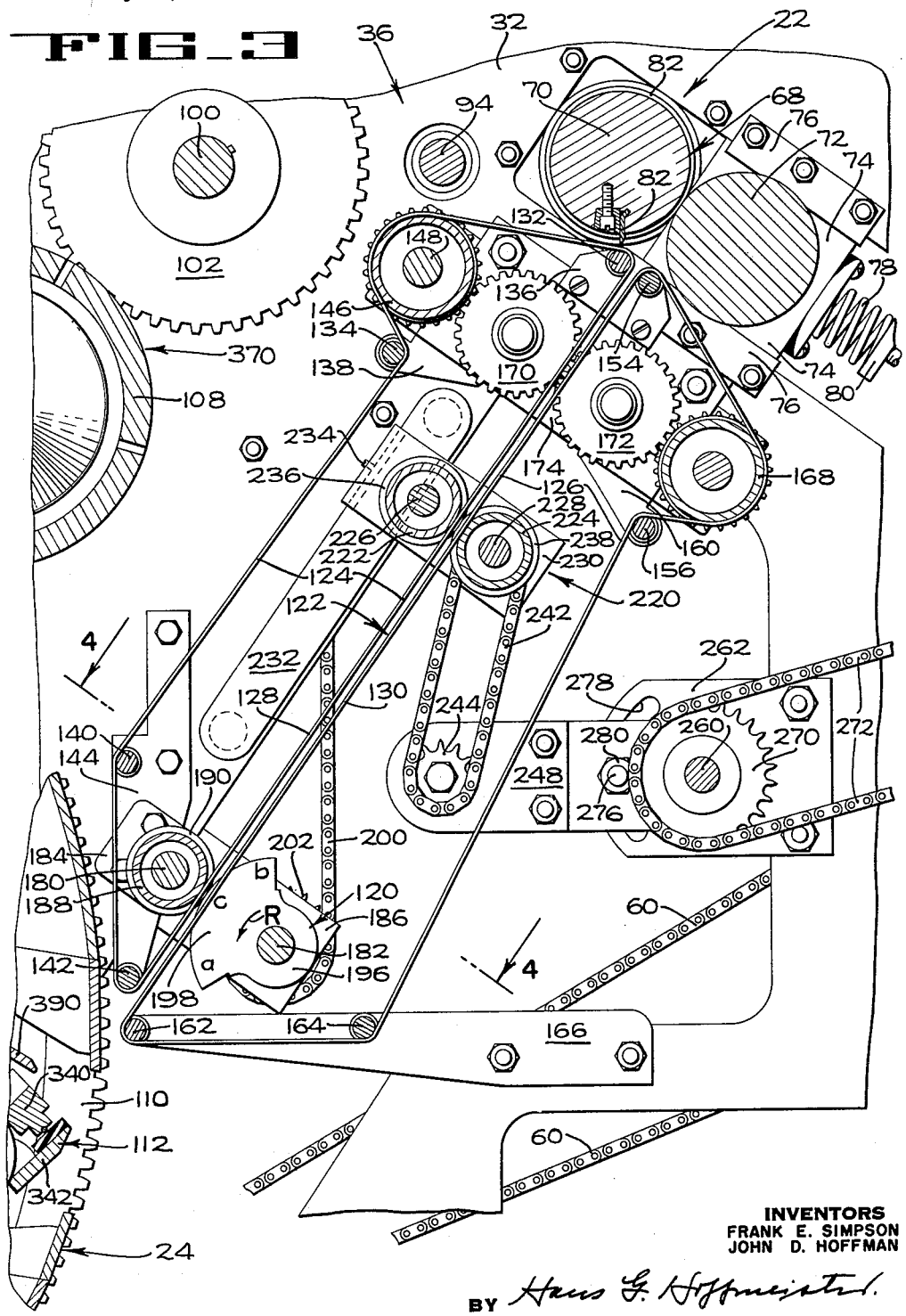

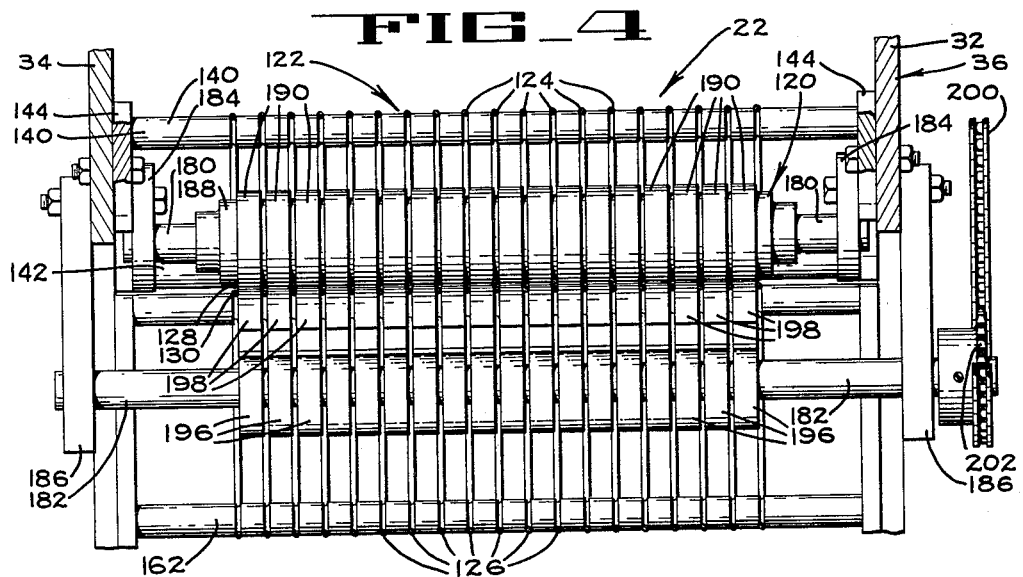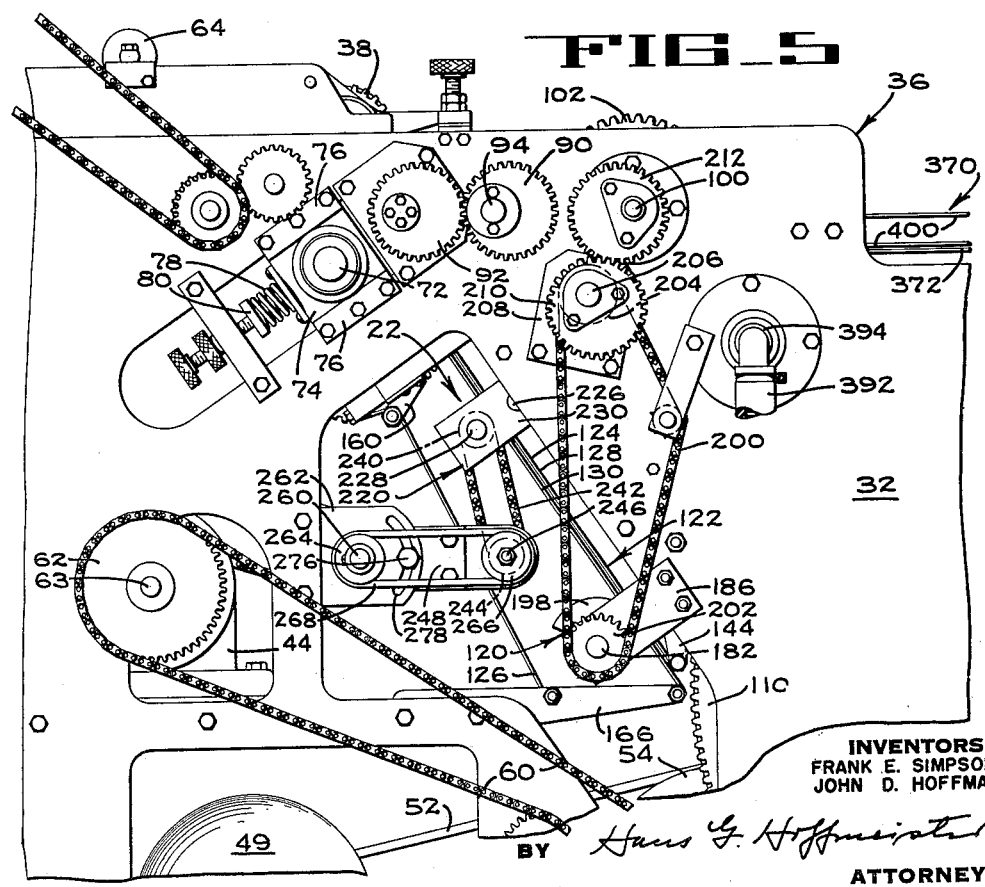

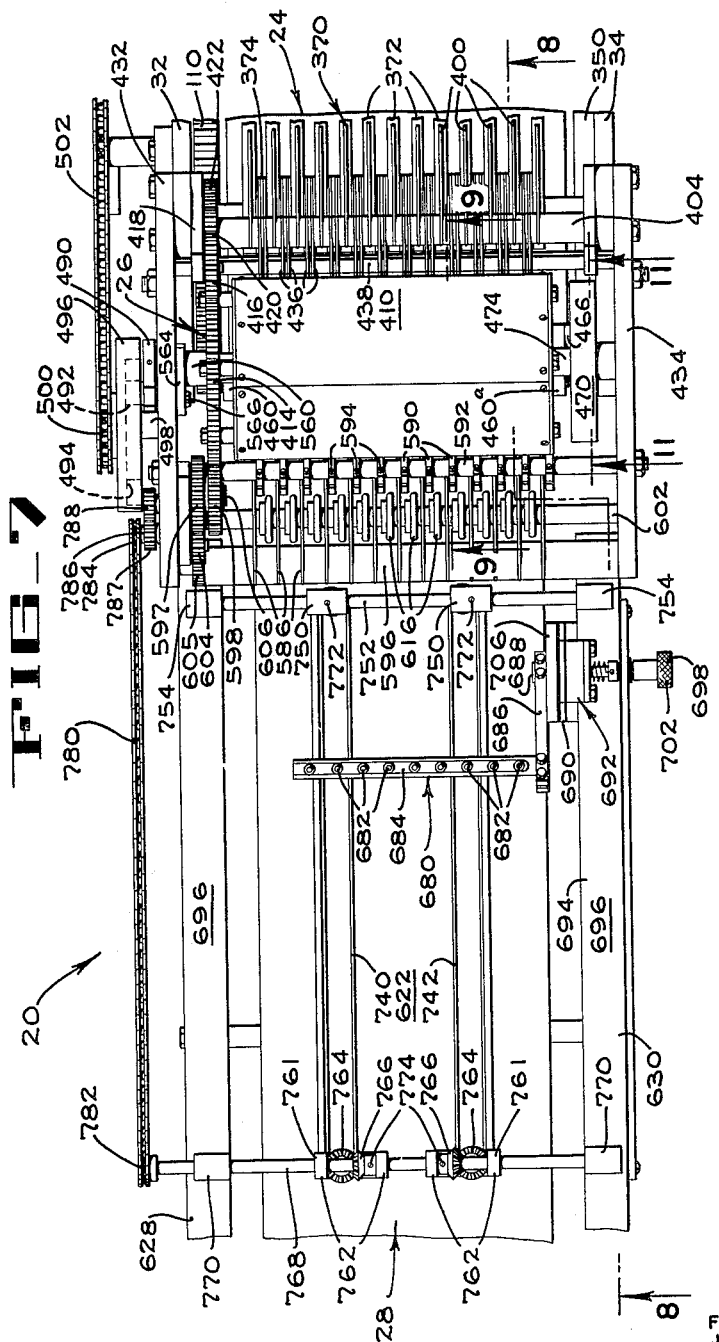

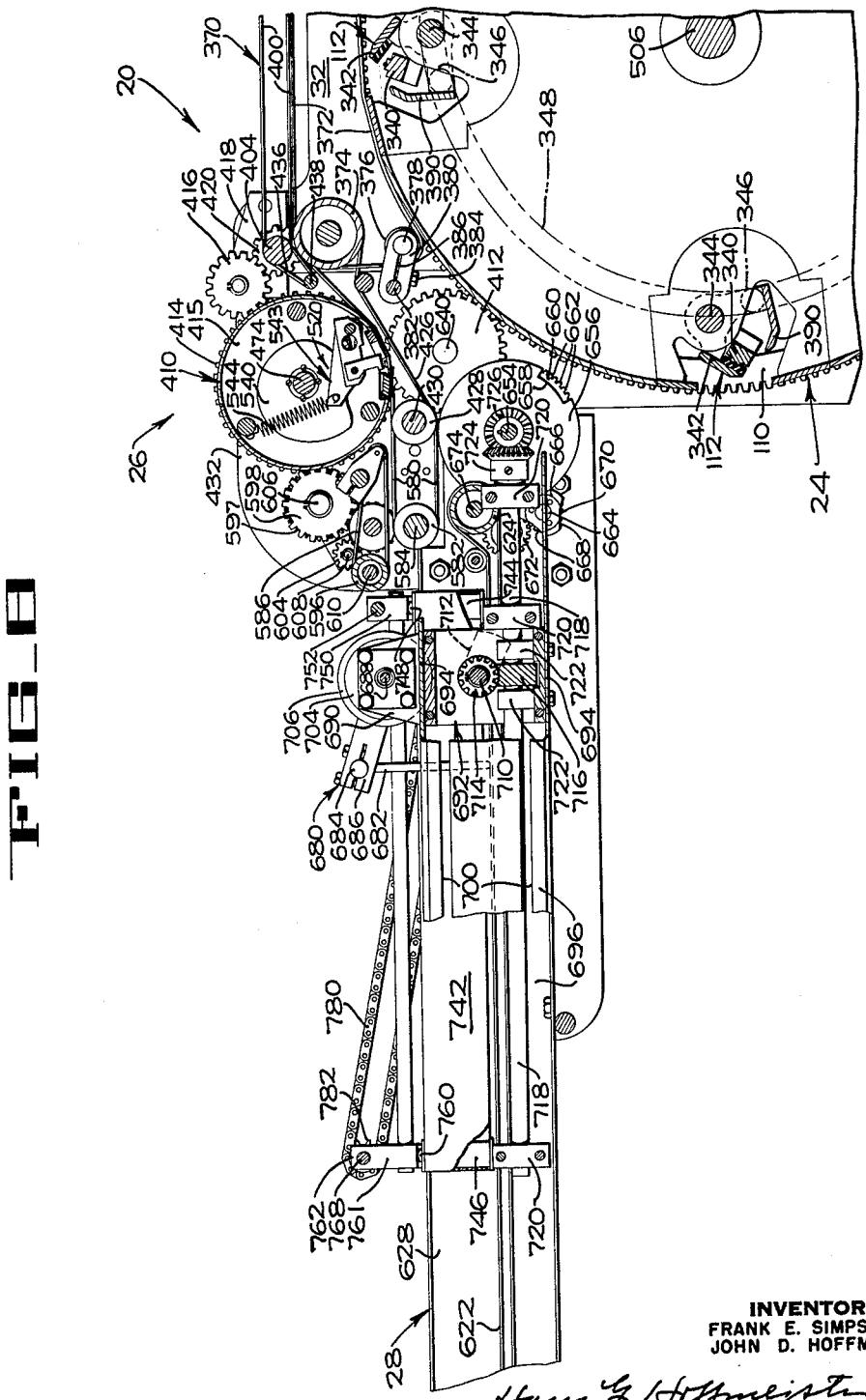

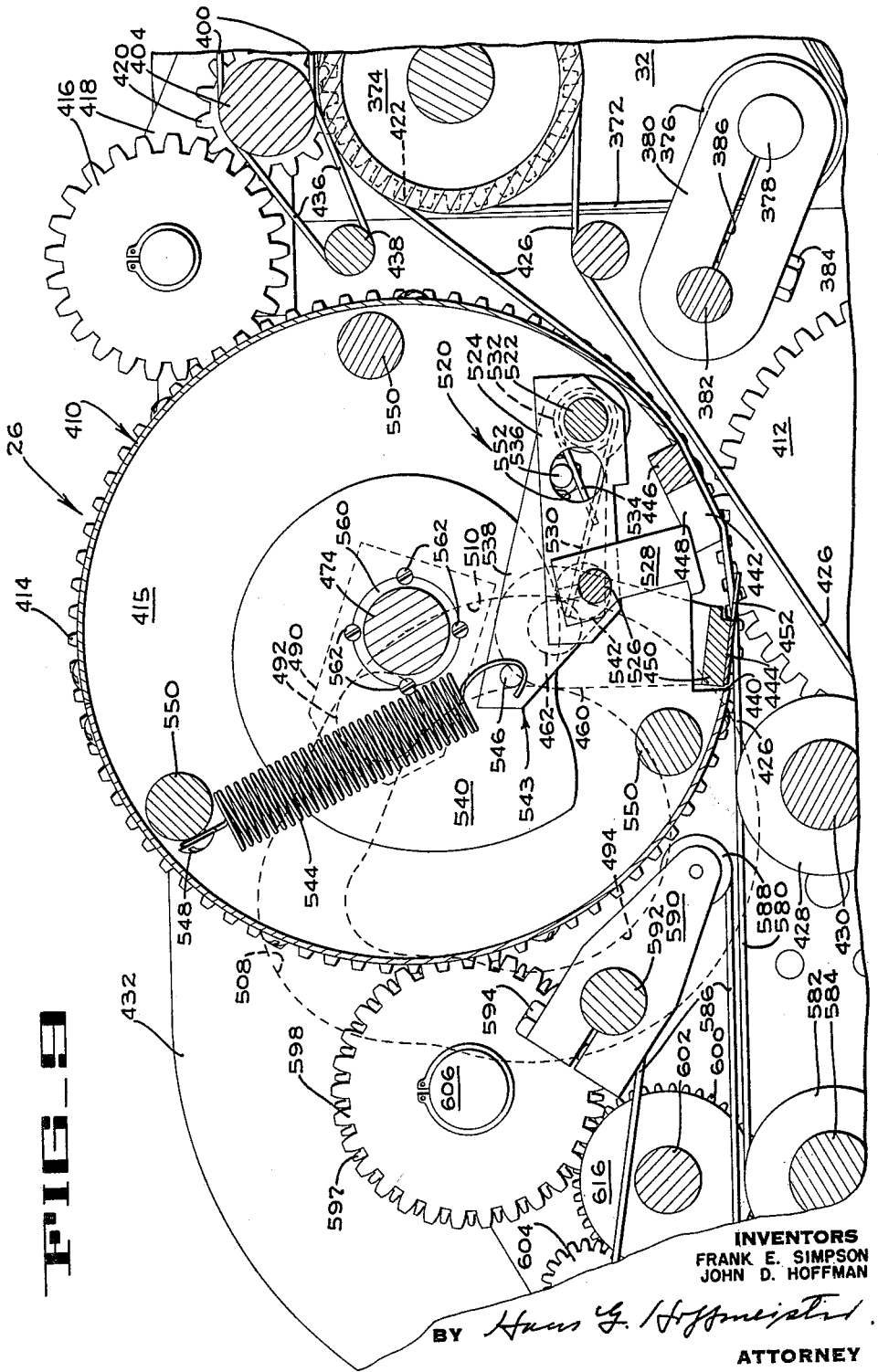

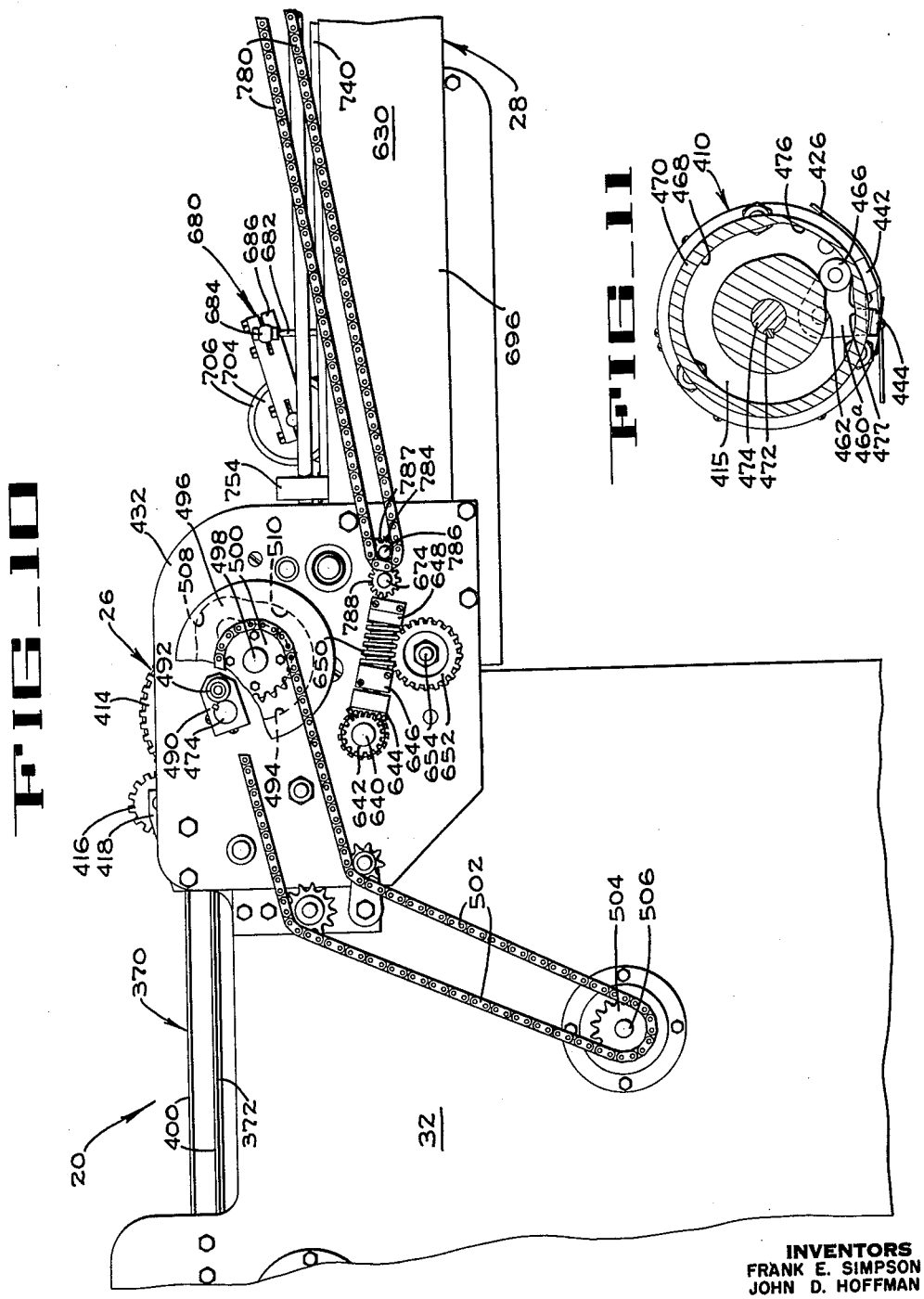

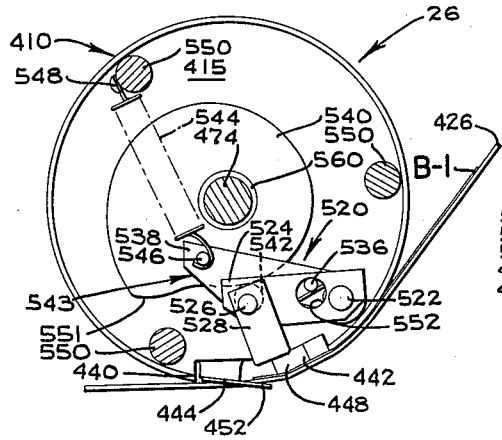
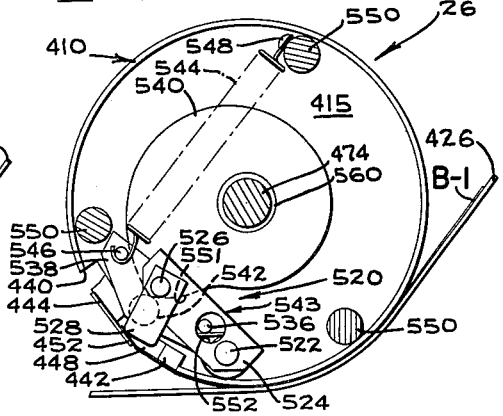
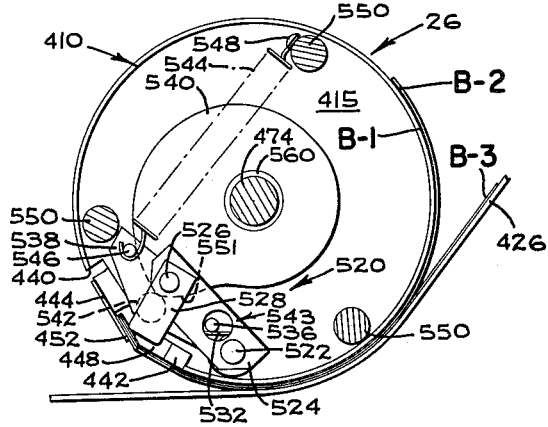
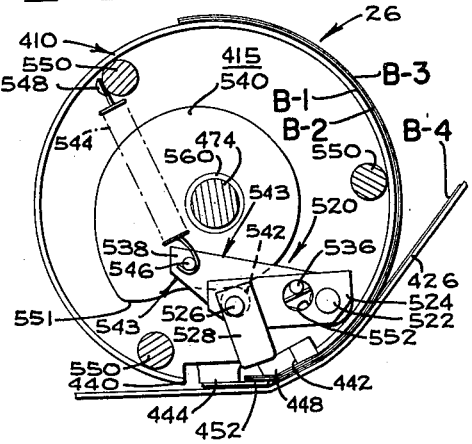
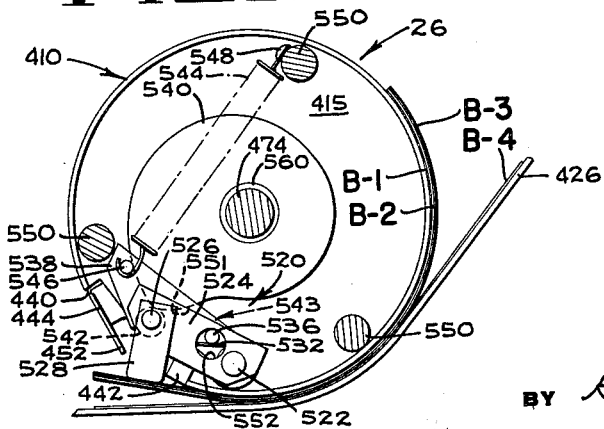

United States Patent Office 3,093,280  
Patented June 11, 1963

3,093,280  
BAG MAKING MACHINE  
Frank E. Simpson, Castro Valley, and John D. Hoffman, San Lorenzo, Calif., assignors to FMC Corporation, a corporation of Delaware  
Filed May 22, 1959, Ser. No. 815,159  
10 Claims. (Cl. 225—96)

This invention relates to bag making machinery, and more particularly to a machine for making bags from a continuous parent sheet, or film, of tubular material.

Certain types of sheet plastic material from which bags are formed is possessed of so little body or stiffness that difficulty is encountered in advancing the material through a bag making machine. For example, in feeding successive bag lengths of such flimsy material as polyethylene to transverse sealing jaws carried by a rotating drum, it is impractical to pull the piece of bag stock by a mechanism gripping or otherwise attached to the leading end of the piece because the presence of such attaching means at the leading end of the piece would interfere with entry of the leading end into the space between the sealing jaws. If it is attempted to propel a bag length of flimsy stock by means connected to the bag length at a point spaced rearward from the leading edge, the part of the bag length in advance of the propelling means tends to wrinkle and to deviate from the path required for entry thereof into the transverse sealing jaws, and thus to interfere with proper engagement of the bag length with the transverse sealing mechanism.

An object of the present invention is to provide an improved bag making machine.

Another object of the invention is to provide improvements in bag making machinery that are particularly advantageous for, but which are not necessarily limited to, use in a machine for making bags from sheet material of such flimsy, or sleazy, nature that difficulty has heretofore been encountered in advancing the material through an automatic bag making machine.

Another object is to provide an improved mechanism for transferring successively formed bags or pieces of bag stock from a part of a bag making machine where one operation is performed thereon to another part of the machine.

Another object is to provide an improved transfer mechanism for feeding successive lengths of bag stock to a series of moving gripping jaws, which functions to impose a slight drag upon a trailing part of each bag length after a leading part of the same has been engaged by a moving gripper, thus to smooth out any wrinkles that might otherwise occur in the part of the bag length that is caught between the jaws of the gripper.

Another object of the invention is to combine a mechanism for transferring successive bag lengths to a series of moving grippers with a mechanism for tearing, or pulling, each succeeding bag length off the film of parent bag stock which has been weakened along a transverse line as by a transverse row of slits or perforations leaving only a row of spaced-apart relatively weak webs connecting the bag length to the supply web.

Another object is to provide an improved mechanism for piling bags supplied successively thereto into uniform stacks each consisting of a predetermined number of bags.

Another object is to provide a bag stacking mechanism particularly suited for, but not necessarily limited to, the stacking of bags made of sleazy sheet material.

Another object is to provide a bag stacker capable of handling bags made of sheet material having little body or inherent stiffness, which stacker is adapted for incorporation into an automatic bag making machine as one of the operative components thereof.

Other and further objects and advantages of the present invention will become apparent from the following description and the accompanying drawings in which:

FIGURE 1 is a fragmentary plan, partly schematic, of an automatic bag making machine incorporating the principles of the present invention.

FIGURE 2 is an enlarged fragmentary section along lines 2—2 of FIG. 1 showing the mechanism of the invention for severing succeeding bag lengths from a continuous film or strip of tubular bag stock and for transferring the individual bag lengths to a transverse sealing mechanism.

FIGURE 3 is a further enlarged section similar to FIG. 2 taken along lines 3—3 of FIG. 1.

FIGURE 4 is a transverse section taken through the transfer mechanism along lines 4—4 of FIG. 3.

FIGURE 5 is a fragmentary enlarged elevation viewed as indicated by the lines 5—5 of FIG. 1 and showing parts of the drive mechanism for the bag length tearing and transfer mechanism of FIGS. 2, 3, and 4.

FIGURE 6 is a view similar to FIG. 3 showing a slightly modified form of bag length severing mechanism.

FIGURE 7 is an enlarged fragmentary plan of the discharge end of the machine of FIG. 1 showing the improved mechanism for collecting the finished bags into groups and for piling the groups into orderly piles, each containing a predetermined number of bags.

FIGURE 8 is an enlarged, fragmentary, partly broken away section along lines 8—8 of FIG. 7.

FIGURE 9 is a further enlarged section along lines 9—9 of FIG. 7 through the drum whereby the bags are collected in groups.

FIGURE 10 is a fragmentary elevation viewed as indicated by the lines 10—10 of FIG. 1 to show some of the drive arrangement for the collecting, stacking, and discharge mechanisms.

FIGURE 11 is an enlarged fragmentary section along lines 11—11 of FIG. 7 showing one of the cam arrangements constituting an operative part of the collecting drum of FIG. 9.

FIGURES 12 to 16, inclusive, are schematic operational views showing successive steps in the operation of the collecting drum of FIG. 9.

FIGURE 1 illustrates the part of an automatic bag making machine 20 which includes the operating components involving the present invention. These components include a mechanism 22 (FIGS. 1 and 2) for severing lengths of stock from a continuous film or strip of tubular bag stock (not shown) and for transferring the successive bag lengths to a sealing drum 24 (FIGS. 2 and 8) that transversely seals each bag length at or adjacent one end thereof, thus forming the bag length of stock into a complete bag, and a stacking mechanism 26 (FIGS. 1 and 7-10) that stacks the completed bags in uniform piles, each consisting of a predetermined number of bags, upon an intermittently advanced discharge conveyor 28 whereby the segregated piles are discharged from the machine 20.

Inasmuch as the present invention is not concerned with the manner in which the parent strip of bag stock is prepared, it will suffice for the purposes of the present disclosure to state that the parent strip is of flattened tubular form and is continuously advanced at a uniform rate by a pair of cooperating feed rollers 30 and 31 and that the parent stock can be of any heat sealable sheet material suitable for use in the manufacture of bags. However, since the present invention is particularly concerned with handling bag stock having very little body or stiffness, the machine 20 including components 22 and 26 incorporating the principles of the present invention will usually be supplied with bag stock of polyethylene or similar relatively flimsy or sleazy heat sealable sheet plastic.

The feed rollers 30 and 31 are suitably journaled in bearings (not shown) on the opposed sides 32 and 34 of the machine frame 36 and are interconnected for simultaneous rotation in opposite directions by intermeshing gears 38 and 40 (FIG. 2) secured to the rollers 30 and 31 respectively. The feed rollers are driven by a drive chain 41 (FIGS. 1 and 2) trained around a driven sprocket (not shown) secured to the shaft 31' of the roller 31. The chain 41 is also trained around a drive sprocket (not shown) secured to a countershaft 42 journaled in bearings 43 that are mounted upon the housing of a transmission mechanism 44. The countershaft 42 is driven by a drive chain 45 trained around a sprocket 46 on the countershaft 42 and around a sprocket 47 on the output shaft 48 of the transmission mechanism 44. The transmission mechanism 44 is mounted in a suitable location, preferably between the frame sides 32 and 34 and is driven by an electric motor 49, (FIG. 2) whose shaft 50 carries a pulley 51 that is connected by drive belts 52 to a larger pulley 54 on a countershaft 56 journaled on and extending between the frame sides 32 and 34. The countershaft 56 likewise carries a drive sprocket 58 connected by a chain 60 to a driven sprocket 62 secured to the input shaft 63 (FIG. 5) of the tranmission mechanism 44. The transmission mechanism 44 is of the variable speed type so that the speed at which the feed rollers 30 and 31 are turned can be increased to permit the production of long bags and can be decreased if shorter bags are to be made. The rotational speed of the feed rollers 30 and 31 remains constant, however, so long as bags of the same length are being manufactured.

The feed rollers 30 and 31 draw the parent strip of tubular bag stock over suitably arranged guide rollers 64 and 66, respectively (FIGS. 1 and 2), journaled upon and extending between the frame sides 32 and 34. From the feed rollers 30, 31 the strip of bag stock advances to and between a transverse perforating mechanism 68 including a knife-bearing roller 70 and an anvil roller 72 disposed in cooperative relation therewith. The knife-bearing roller 70 is journaled in bearings (not shown) mounted in fixed positions upon the frame sides 32 and 34, respectively. The bearings (not shown) in which the anvil roller 72 is journaled, however, are carried by mounting blocks 74, one of which is shown in FIGS. 2 and 3. Each mounting block 74 is slidable toward and away from the knife bearing roller 70 by means of pairs of opposed guide flanges 76 secured, respectively, to the frame sides 32 and 34. Each of the flanges 76 is spaced laterally from its supporting frame side to slidably receive the associated mounting block 74. A coil spring 78 is associated with each mounting block 74, being under compression between the mounting block and a suitable abutment 80 adjustably mounted upon the associated frame side. The springs 78 constantly urge the mounting blocks 74 and the anvil roller 72 toward the knife-bearing roller 70, which is provided adjacent either end with a radially projecting flange 82 (FIG. 3) that makes rolling engagement with the anvil roller 72 to limit the distance that the latter can approach the former. The flanges 82 normally maintain the rollers 70 and 72 so spaced apart that a perforating knife 84 carried by the roller 70 makes proper engagement with the strip of bag stock pasing between the rollers 70 and 72 to perform its perforating operation most efficiently. The spring 78, however, permits the anvil roller 72 to yield so as to increase the spacing between the rollers 70 and 72 in the event that a "pile-up" of bag stock is caused to pass between the two rollers 70 and 72, thus avoiding damage to the apparatus.

The two rollers 70 and 72 of the perforating mechanism 68 are driven by means of gears 86 and 88 (FIG. 1) that are meshed with each other and which are rigidly secured to the rollers 70 and 72, respectively. Whereas under some circumstances of installation and when operating upon certain classes of bag stock material, it may be desirable to have the rollers 70 and 72 rotate at constant speed, in the particular exemplary machine 20 illustrated, they are driven at varying speeds by means of a pair of intermeshing eccentric gears 90 and 92, the latter of which is secured to the shaft (not shown) of the knife-bearing roller 70 on the opposite end thereof from the gear 86, as shown in FIG. 1.

The eccentric gear 90 is secured to one end of a transversely extending shaft 94 (FIGS. 1 and 2) journaled in the frame 36 and driven at a constant speed suitably synchronized with rotation of the transverse sealing drum 24. To accomplish this a driven gear 96 (FIG. 1) secured to the opposite end of the shaft 94 is operably connected to a driving gear 98 carried by a transverse countershaft 100 (FIGS. 1 and 2) and the latter is connected to the transverse sealing drum 24 to be driven thereby by means of intermeshing gears 102 and 104 (FIGS. 1 and 2). The gear 102 is rigid with the countershaft 100, while the gear 104 is rigid with one of the journalling trunnions 106 (one of which is shown in FIG. 2) whereby a bag transferring vacuum drum 108 (to be described more fully hereinbelow) is journaled on the frame 36. The gear 104 is enmeshed with a large gear 110 rigid with one end of the sealing drum 24, thus completing the power train whereby the eccentric gears 90 and 92 are driven from the sealing drum 24.

The large gear 110 and the sealing drum are rotated at constant speed by a spur gear 111 (FIG. 2) secured to the countershaft 56.

The eccentric gears 90 and 92 operate to accelerate the rollers 70 and 72 as the knife 84 approaches the anvil roller 72 so as to cause the rollers to be turning at such a rate that when the actual perforating operation occurs their peripheral speed is the same as, or at least approximately the same as, the linear speed at which the strip of bag stock is advancing, and to thereafter decelerate the rollers. This arrangement permits bags of maximum length, within the limitations of the machine 20, to be produced with relatively small rollers 70 and 72 whose circumference is considerably less than the maximum bag length and without impairing their efficiency in performing the perforating operation.

The cutting edge of the knife 84 is serrated so that instead of severing the bag lengths from the film of bag stock it produces a row of slits, or perforations, spaced apart by unsevered webs of bag stock. Therefore, each bag length whose trailing end is defined by the perforating knife 84 as it passes between the rollers 70 and 72 temporarily remains attached to the parent strip of bag stock. However, the bag stock is weakened in a transverse line to the extent that each bag length can easily be severed from the parent strip of bag stock by a pull-apart mechanism 120 that constitutes one of the operating components of the hereinbefore mentioned severing mechanism 22; and the severing mechanism 22, in turn, constitutes a part of a transfer mechanism 122 (FIGS. 2–5) whereby the successive bag lengths are advanced from the perforating mechanism 68 to the transverse sealing drum 24.

The transfer mechanism 122 (FIGS. 2–5) comprises an upper series 124 of transversely spaced parallel belts and a similar, lower series 126 of transversely spaced, parallel belts. Each of the belts 124 and 126 is formed from a suitable length of spring wire in helical form and is under such tension that the adjacent runs 128 and 130 of the belts 124 and 126, respectively, extend in straight lines from the perforating mechanism 68 to a position adjacent the periphery of the transverse sealing drum 24 where successive bag lengths are transferred to successive gripping and sealing clamps 112 carried by the drum 24. The belts 124 of the upper series are trained around an upper pair of grooved rollers 132 and 134 extending transversely of the machine 20 and journaled in brackets 136 and 138, respectively, secured to the frame sides 32 and 34. The upper belts 124 are likewise trained around a lower pair of grooved rollers 140 and 142, both of which are journaled in brackets 144 secured to the frame sides 32 and 34. All of the rollers 132, 134, 140 and 142 are freely rotatable and the belts 124 are trained around and are driven by a grooved drum 146 whose shaft 148 is journaled in and extends between the frame sides 32 and 34. The shaft 148 is provided with a gear 150 (FIG. 2) rigid therewith and in meshing engagement with a gear 152 (FIG. 2) rigid with the hereinbefore mentioned shaft 94 so that the belts 124 are driven at constant speed suitably synchronized with the peripheral speed of the transverse sealing drum 24.

The belts 126 of the lower series are trained around an upper pair of grooved rollers 154 and 156 extending transversely of the frame 36 and journaled, respectively, in brackets 136 and 160 (FIG. 3) carried by the frame sides 32 and 34. The belts 126 are also trained around a lower pair of grooved rollers 162 and 164 extending transversely of the machine 20 and journaled in brackets 166 secured to the frame sides 32 and 34. The lower belts 126 are likewise trained around and are driven by a grooved drum 168 operably connected to the grooved drum 146 of the upper series of belts 124 by means of two intermeshing idler gears 170 and 172, both of which are rotatably mounted on a bracket 174 secured to the frame side 32. Thus, the upper and lower belts 124 and 126, respectively, are driven at the same linear speed but in opposite directions, those directions being such that the adjacent runs 128 and 130 thereof move obliquely downward from the perforating mechanism 68 toward the transverse sealing drum 24.

Each of the belts 124 is directly opposite one of the belts 126 and the runs 128 and 130 thereof which, as above mentioned, are parallel to each other, are spaced only a short distance apart so that although a bag length of bag stock confined between the runs 128 and 130 is free to move relatively to the belts 124 and 126, nevertheless, the bag stock is held substantially flat and thus prevented from wrinkling or buckling during its progress through the transfer mechanism 122.

The severing mechanism 22 includes the pull-apart mechanism 120 (FIGS. 2–4) disposed adjacent the lower end of the transfer mechanism 122. It comprises upper and lower shafts 180 and 182, respectively, extending transversely of the machine 20 at opposite sides of the adjacent, parallel runs 128 and 130 of the belts 124 and 126, respectively. The shafts 180 and 182 are journaled in brackets 184 and 186, respectively, secured to the frame sides 32 and 34. The upper shaft 180 carries a cylindrical drum 188 to whose outer circumferential surface a series of rubber rings 190 are secured in spaced-apart relation, the spacing between the rings 190 being sufficient to accommodate one of the belts 124 between each two adjacent rings 190, as best shown in FIG. 4. The radial thickness of each of the rings 190 is such that the rings project between each two adjacent belts 124 to a position approximately mid-way between the adjacent, parallel runs 128 and 130 of the belts 124 and 126, respectively, as best shown in FIG. 3.

Rigidly secured to the lower shaft 182 is a series of spaced-apart discs 196, the spacing being such that each disc 196 is directly opposite one of the rings 190 carried by the upper shaft 180. Each disc 196 is radially enlarged through approximately 120° of its periphery to define a sector-shaped plate 198 adapted to establish rolling engagement with one of the rings 190 during approximately one-third of each full turn of the shaft 182 by projecting between two adjacent belts 126, as best shown in FIG. 3.

Whereas the shaft 180 which carries the drum 188 and the rubber rings 190 is free to rotate with respect to its mounting brackets 184, the shaft 182 which carries the sector plates 198 is driven by a chain 200 (FIGS. 2–5) trained around a sprocket 202 rigid with one end of the shaft 182. The chain 200 is likewise trained around a sprocket 204 (FIG. 5) rigid wth a stub shaft 206 projecting laterally outward from a bracket 208 secured to the outer face of the frame side 32. Also secured to the stub shaft 206 is an eccentric gear 210 that is enmeshed with a companion eccentric gear 212 rigid with one end of the hereinbefore mentioned countershaft 100 that projects through the frame side 32. Thus, the upper eccentric gear 212 is constantly driven in timed relationship with the sealing drum 24 and the lower eccentric gear 212 is driven at a constant average rate which alternately accelerates and decelerates once during each full revolution, imparting similar acceleration and deceleration to the sector plates 198 during each full turn thereof.

The sectors 198 are in straight alignment with each other, so that they all engage their respectively associated rings 190 simultaneously. The sector plates 198 rotate in the direction indicated by the arrow R of FIG. 3 and the parts are so proportioned and arranged that when either the leading or trailing ends $a$ or $b$, respectively (FIG. 3), of the arcuate edges of the sectors 198 are adjacent the drum 188 the peripheral speed of the sectors is substantially the same as the linear speed of the belts 124 and 126; but when the intermediate region $c$ of the arcuate edges of the sectors 198 are adjacent the drum 188 the peripheral speed of the sector plates 198 is considerably greater than the linear speed of the belts 124 and 126.

The pull-apart mechanism 120 is so spaced from the perforating mechanism 68 that the region $a$ of the arcuate edges of the sector plates 198 moves into position adjacent the cylinder 188 just as the leading end of a bag length arrives in position between the sector plates 198 and the drum 188. Consequently, when the bag length is initially gripped between the sector plates 198 and the rubber rings 190 their peripheral speed is approximately that of the advancing bag length. From that time on, however, and until the region $c$ of the arcuate edges of the sector plates 198 arrives in position adjacent the cylinder 188 the peripheral speed of the sector plates 198 and the cylinder 188 rapidly increases with the result that the bag length then gripped between the sector plates and the rubber rings 190 is accelerated to a speed greater than that at which the parent strip of bag stock is advancing, with the result that the bag length then gripped by the pull-apart mechanism 120 is severed from the parent strip of bag stock along a line of perforations formed by the perforating mechanism 68 and extending transversely across the strip of bag stock.

In order to assure that only one bag length is thus pulled away from the parent strip of bag stock at a time, a hold-back mechanism 220 (FIGS. 2, 3 and 5) is included as an operating component of the pull-apart mechanism 120. The hold-back mechanism 220 comprises a pair of cooperating cylinders 222 and 224, respectively, disposed at opposite sides of the adjacent, parallel runs 128 and 130 of the belts 124 and 126, respectively. These cylinders 222 and 224 are carried by shafts 226 and 228, respectively, extending transversely of the machine 20 and journaled in transversely aligned brackets 230, one of which is shown in FIG. 3. Each of the brackets 230 is slidably mounted on a track or ways 232 extending parallel to the runs 128 and 130 of the belts 124 and 126. The bracket 230 is adapted to be releasably secured in selected position of adjustment upon the ways 232 by a set screw 234. The cylinders 222 and 224 are each provided with a series of spaced-apart rubber rings 236 and 238, respectively, of such thickness that they project between the belts 124 and 126, respectively, so that the rings of one series make rolling engagement with the rings of the other series when no bag stock is disposed between the two series of rings 236 and 238. However, the shaft 228 on which the cylinder 224 is mounted is positively driven with the result that when bag stock is inserted between the rings 236 and 238 of the respective series, the bag stock will be advanced thereby.

Means are provided for driving the shaft 228 at a rate that will cause bag stock thus gripped between the rings 236 and 238 of the two cylinders to advance with the runs 128 and 130 of the belts, but only at the speed at which bag stock is advanced to the perforating mechanism 68 by the feed rollers 30 and 31. For this purpose the shaft 228 is provided with a sprocket 240 (FIG. 5) upon which a chain 242 (FIGS. 3 and 5) is trained. The chain is likewise trained around a sprocket 244 (FIG. 3) carried by a shaft 246 that is journaled in a bracket 248 mounted for pivotal adjustment about a stub shaft 260 which in turn is journaled in a stationary bracket 262. The stub shaft 260 carries at one end a pulley 264 (FIG. 5) which is connected to a pulley 266 on the shaft 246 by a V-belt 268. The stub shaft 260 is likewise provided with a sprocket 270 (FIGS. 2 and 3) rigid therewith, which, as best shown in FIG. 2 is connected by a chain 272 to a third sprocket (not shown) on the countershaft 42, this being the shaft that is driven by the chain 45 from the output shaft 48 of the transmission mechanism 44, as hereinabove explained.

Thus it may be seen that the cylinders 222 and 224 of the hold-back mechanism and the feed rollers 30 and 31 are both driven from the countershaft 42. The various involved sprockets and V-belt pulleys are so proportioned that the cylinders 222 and 224 of the hold-back mechanism rotate at the proper speed with relation to the rotational speed of the feed rollers 30 and 31 to retain the strip of bag stock extending between these two parts of the machine uninterruptedly smooth.

As hereinabove stated, the function of the hold-back mechanism 220 is to prevent more than a single bag length of stock from being severed from the parent strip during each cycle of operation of the pull-apart mechanism 120. It is desirable, therefore, that the hold-back mechanism 220 be spaced from the pull-apart mechanism 120 a distance greater than the length of a single bag and less than the length of two bags. Therefore, when the speed regulating transmission mechanism 44 is adjusted to cause the machine 20 to produce bags of a different length, it may be necessary to change the position of the hold-back mechanism 220 and it is for this reason that the hold-back mechanism is slidably mounted upon the track or ways 232. If shorter bags are to be produced, the hold-back mechanism 220 should be shifted downward toward the pull-apart mechanism 120, whereas if longer bags are to be produced, the hold-back mechanism will be shifted in the opposite direction. It is to compensate for such adjustment of the hold-back mechanism that the bracket 248 on which the shaft 246 is journaled is mounted for pivotal adjustment about the shaft 260, thus to attain proper tensioning of the chain 242 when the bracket 230 of the hold-back mechanism 220 is adjusted to a new position. A bolt 276 (FIGS. 2, 3 and 5) extending through the bracket 248 and through an arcuate slot 278 in the bracket 262 is provided with a nut 280 which, when tightened, clamps the bracket 248 in its selected position.

FIG. 6 illustrates a slightly modified form of hold-back mechanism 286 having cylinders 288 and 290, respectively, corresponding to the cylinders 222 and 224 of the first described form of hold-back mechanism 220 and mounted similarly thereto. Whereas the cylinder 288 is provided with a series of spaced-apart rubber rings 292 similar to those of the first described cylinder 222, its companion cylinder 290 instead of having spaced rings on its circumference is provided with a row of short fingers 294, each of which is adapted to make contact with one of the rings 292 once during each full turn of the cylinders 288 and 290. The shafts 296 and 298 of the cylinders 288 and 290, respectively, are journaled in their supporting brackets 300 for rotation about axes at a fixed distance apart, that distance being such that a strip of bag stock will be free to move between the cylinders 288 and 290 at all times except when the fingers 294 are turned toward the cylinder 288, at which time the fingers 294 engage the bag stock and press it against the rings 292 of the companion cylinder 288. Such engagement of the fingers 294 with the bag stock serves to hold the bag stock back while a single bag length is being severed therefrom by the pull-apart mechanism 120.

The cylinders 288 and 290 of the hold-back mechanism 286 are caused to make one complete revolution for each bag length of bag stock that passes therebetween, but in a somewhat different manner than the cylinders 222 and 224 of the first described form of hold-back mechanism 220 are driven. A sprocket (not shown) rigid with the shaft 298 of the cylinder 290 is connected by a chain 302 to a sprocket 304 rigid with a stub shaft 306 journaled in a pivotally mounted bracket 308 that is free to rotate about the axis of a shaft 310 journaled in a stationary bracket 312. A feed belt or chain 314 is trained around pulleys or sprockets, as the case may be, rigid with the shaft 306 and 310, respectively. The shaft 310, instead of being connected to the transmission mechanism 44 is connected by a chain 316 trained around a sprocket 318 thereon with a sprocket 320 on an auxiliary shaft 322 which also carries a spur gear 324 in meshing engagement with the hereinbefore mentioned large gear 110 rigid with and concentric with the transverse sealing drum 24.

Inasmuch as the details of construction and manner of operation of the transverse sealing drum 24 (FIGS. 2, 3, 6 and 8) and of the gripping and sealing clamps 112 thereof do not constitute any part of the present invention, only the most general description thereof will suffice for purposes of the present disclosure. In the exemplary machine 20 illustrated, the sealing drum 24 is provided with four such gripping and sealing clamps, each of which consists of a stationary jaw 340, i.e., a jaw that is rigid with the drum 24, and a jaw 342 that is pivotally mounted by means of a suitable pivot 344 for movement toward and away from the stationary jaw 340. The stationary jaw 340 is provided with a suitable electrical resistance (not shown) which is energized by a suitable circuit (not shown) so as to maintain the stationary jaw 340 at a temperature sufficiently high to seal the two sides of a bag length of heat sealable material together along a transverse line when the bag length is pressed against the jaw 340 by the movable jaw 342. A cam follower roller 346 is carried by each movable jaw 342 and is engaged within an endless cam groove 348 formed in one face of a disc cam 350 that is mounted in fixed position adjacent one end of the drum 24. The cam groove 348 is so designed that each movable jaw 342 is moved toward the associated fixed, heated jaw 340 immediately after the associated clamp 112 is carried past a position of alignment with the runs 128 and 130 of the belts 124 and 126, respectively, of the transfer mechanism 122, and to open each clamp 112 after the same has been carried from that position through approximately 270° of rotation of the drum 24.

The speed regulating transmission mechanism 44 can be adjusted to cause the perforating mechanism 68 to complete a full cycle each time a length of bag stock is advanced therepast, so as to form lines of perforations in the bag stock spaced apart distances equal to the desired bag length. Immediately after such a line of perforations has passed the plane that includes the axes of the shafts 180 and 182 of the pull-apart mechanism 120 the bag stock will be gripped between the leading parts *a* of the sector plates 198 and the respectively associated rings 190 on the companion drum 188. As this occurs, the rotational speed of the sector plates 198 increases with the result that the progress of the bag length then gripped by the pull-apart mechanism 120 will be accelerated. However, the next following bag length is still gripped between the cylinders of the hold-back mechanism 220, or of the alternate form of hold-back mechanism 286, as the case might be, so that the said next following bag length is not permitted to increase its rate of advance. Therefore, the leading bag length, i.e., the one that is engaged by the pull-apart mechanism 120 will be severed from the next following bag length by tearing apart of the several webs that interconnect the two said bag lengths.

At approximately the time that the intermediate portions c of the arcuate edges of the sector plates 198 reach their positions closest to the drum 188, the leading edge of the bag length then gripped by the pull-apart mechanism 120 will be passing beyond the lowermost ends of the runs 128 and 130 of the belts 124 and 126, respectively, after which the portion of the bag length that passes beyond these runs of the belts will be unsupported thereby. Herein lies one of the important functions of the transfer mechanism 122 of the present invention which is to assist this unsupported leading portion of the bag length to enter the space between the jaws 340 and 342 of one of the gripping and sealing clamps 112. It is to be understood that rotation of the drum 124 is so synchronized with, and in such phase relationship with, the perforating mechanism 68 and the pull-apart mechanism 120 that one of the clamps 112 will be in position to receive the leading end of one of the bag lengths immediately after the same has departed from the lower end of the transfer mechanism 122. As stated, this occurs at or very close to the time that the intermediate portions c of the arcuate edges of the sector plates 198 are in their positions closest to the drum 188, i.e., at the time when the bag length is advancing at its greatest speed. Thereafter, and as the trailing parts b of the arcuate edges of the sector plates 198 approach their positions closest to the drum 188, rotation of the shaft 182 is decelerated as hereinabove explained. This occurs at such a rate that although the bag length gripped by the pull-apart mechanism 120 is still being progressed toward and into the respective clamp 112 of the drum 24, the inertia of the leading part of the bag length which tends to cause the same to continue to advance at the same rate imposes a considerable degree of tension upon the part of the bag length that has passed beyond the pull-apart mechanism 120 because of the drag that the decelerating sector plates 198 impose upon the trailing part of the bag length. The effect of this arrangement is that the leading part of the bag length unerringly and dependably enters the space between the open jaws 342 of the respective clamp 112 and immediately thereafter these jaws close to grip the leading edge of the bag length between the movable jaw 342 and the fixed jaw 340. The instant that such clamping is completed occurs a brief interval before the trailing region b of the arcuate edges of the sector plates 198 passes the plane that includes the axes of the shafts 180 and 182 with the result that after the leading edge of a bag length has been gripped by a clamp 112 the trailing part of the bag length is still being decelerated by the pull-apart mechanism 120. This condition prevails for an interval which, though brief, is sufficiently prolonged to smooth out any wrinkles that might occur in the part of the bag length that is gripped between the movable and fixed jaws 340 and 342, respectively, but is not of sufficient duration to tend to pull the leading end of the bag length from between the jaws 340 and 342.

Upon passage of the trailing region b of the arcuate edges of the sector plates 198 beyond their position closest to the drum 188 the bag length theretofore gripped by the pull-apart mechanism 120 will be released so that it can slide freely out from between the belts 124 and 126 of the transfer mechanism 122, leaving the leading end of the bag length gripped within one of the clamps 112 throughout the time that the drum turns through approximately 270°. Since the stationary jaw 340 of the clamp is heated as hereinabove explained, pressure of the bag against the stationary jaw 340 throughout this period will cause the two sides of the bag length to be welded together in a transverse line adjacent the leading end thereof, thus closing that end of the bag and completing the formation of the bag length of tubular bag stock into a bag that can be opened at its opposite end.

Immediately above the transverse sealing drum 24 is mounted a mechanism 370 (FIGS. 1, 2, 7 and 8) for transferring the successive completed bags to the stacking mechanism 26 of the present invention. This transfer mechanism 370 comprises a series of parallel belts 372 trained around the hereinbefore mentioned vacuum drum 108 (FIG. 2), around a smaller drum 374, and around a series of rollers or wheels 376, one of which is shown in FIGS. 2 and 8. Each of the rollers 376 is rotatable upon a pin 378 and each pin is clamped within the corresponding end of a link 380. The other ends of the several links 380 are clamped upon a transversely extending rod 382 (FIG. 8) by means of a bolt 384, one of which is associated with each link 380. Each bolt 384 extends through one side of the associated link 380 and across a slot 386 separating the two sides of the link and is threaded into the opposite side of the link so that when the bolt 384 is tightened the link is clamped upon the rod 382. This arrangement permits individually adjusting the several rollers 376 so that the tension of the several belts 372 can be regulated individually.

As best shown in FIG. 2 the rollers 376 and the drum 108 are so positioned that their respective circumferential surfaces are closely adjacent the periphery of the drum 24. The rollers 376 and the drum 108 are spaced apart, i.e., they are angularly separated around the surface of the drum 24, a sufficient distance for the belts 372 to make contact with the surface of the drum 24 throughout an arc whose angular extent is of the order of from 60 to 80°. The cam groove 348 associated with the sealing drum 24 is so designed that it is while each successive gripping and sealing clamp 112 of the drum 24 is within this portion of its circular orbit that the clamp is caused to open to release the sealed bag theretofore gripped by that particular clamp. Rigidly associated with the movable jaw 342 of each clamp 112 is a stripper bar 390 that is pushed outward past the respective stationary jaw 340 as the movable jaw 342 opens and thereby positively releases the bag which might otherwise tend to adhere to the heated stationary jaw 340. Preferably this release of the bag occurs just before the bag reaches the vacuum drum 108 so that a substantial length of the trailing part of the bag will be gripped between the belts 372 and the periphery of the drum 24 before the leading end of the bag is released by the clamp 112.

After each successive bag has thus been released, the bag is advanced by the rotating drum 24 to the vacuum drum 108. A partial vacuum is maintained within the drum 108 by means of a vacuum pipe line 392 (FIGS. 1 and 5) and a swivel pipe joint 394 connecting the vacuum line 392 to the trunnion 106 which is illustrated in FIG. 2.

As a result of this arrangement, as each successive bag passes beyond the place where it is held against the sealing drum 24 by the belts 372 the bag is held against the outer surface of the vacuum drum 108 by atmospheric pressure and thus is caused to follow the contour of the drum 108 in spite of the fact that throughout this period of its advance it is on the outside of the belts 372 which preferably are seated within circumferential grooves (not shown) in the surface of the drum 108 to permit the bag to lie flat against the surface of the drum 108.

As hereinabove explained, the vacuum drum 108 is driven so that it has the same peripheral speed as the sealing drum 24 by the gear 104 rigid with the drum 108 and enmeshed with the large gear 110 of the sealing drum 24. Thus the belts 372 are driven at the same linear speed as the peripheral speed of the drum 24.

Another series of belts 400 is operably mounted immediately above the upper runs of the belts 372. Advantageously, each of the belts 400 is in the form of a spiral spring and the belts 400 correspond in number to that of the belts 372, being so disposed that one of the belts 400 lies immediately above one of the belts 372 with the lower run of the belt 400 parallel to and closely adjacent the upper run of the belt 372. The belts 400 are trained around parallel, longitudinally spaced, grooved rollers 402 and 404, respectively, suitably journaled in and extending between the frame sides 32 and 34. The roller 402 is directly above the vacuum drum 108 with the result that as each successive bag is stripped off the rotating vacuum drum 108 by the straight upper runs of the belts 372 the leading end of the bag is already engaged between the upper runs of the belts 372 and the lower runs of the belts 400.

The roller 404 of the upper series of belts 400 is so positioned that the belts 400 are enabled to hold the successive bag lengths against the upper surfaces of the upper runs of the belts 372 until they have passed slightly beyond the vertical plane that includes the axis of the drum 374. From this position the successive bags are carried obliquely downward and forward to the lower portion of the circumference of a collecting drum 410 (FIGS. 1, 7, 8 and 9) which is positively rotated in suitably timed relationship with the other operating components of the machine 20 by means of an idler gear 412 (FIGS. 8 and 9) freely journaled on the frame side 32 and enmeshed with the large gear 110 of the transverse sealing drum 24 and with a gear 414 rigid with one of the heads of the collecting drum 410, one of which heads is indicated at 415 in FIGS. 8 and 9. Another idler gear 416 freely journaled upon an extension 418 of the frame side 32 is enmeshed with the gear 414 of the collecting drum 410 and with a gear 420 rigid with the roller 404, thus providing means for positively driving the upper series of belts 400 of the transfer mechanism 370. The gear 420 is likewise enmeshed with a gear 422 (FIG. 9) rigid with the drum 374 about which the lower series of belts 372 of the transfer mechanism 370 are trained.

The gear 422 of the drum 374 drives still another series of belts 426 which extend obliquely downward and forward from the drum 374 so that the upper runs of the belts 426 engage the circumference of the collecting drum 410 throughout arcs of considerable angular extent, as best shown in FIG. 9. The belts 426 are advantageously of the spiral spring type so that their upper runs are held firmly and yet yieldably in engagement with the drum 410 throughout the full extent of these arcs. The belts 426 are trained around a grooved idler roller 428 which is carried by a shaft 430 extending between frame extensions 432 and 434.

Thus it may be seen that the belts 426 carry the bags successively from the discharge end of the transfer mechanism 370 downward and forward so as to press them against the circumference of the rotating collecting drum 410. To assist the belts 426 in so directing the bags from the transfer mechanism 370 an auxiliary series of relatively short belts 436 are trained around the grooved roller 404 (FIG. 9) and around a smaller idler roller 438 which preferably is similarly grooved and is rotatably supported by and extends between extensions 432 and 434 of the frame sides 32 and 34, respectively. The lower runs of the belts 436 are inclined downward and forward from the roller 404 so that as a bag leaves the belts 372 and 400 it is deflected downward and thus caused to lie upon the upper runs of the belts 426 which guide the leading end of each succeeding bag into engagement with the circumference of the drum 410 to lie flat thereagainst and to advance therewith as the drum 410 turns.

The collecting drum 410 constitutes the first operating component of the stacking mechanism 26. It is provided with an opening 440 (FIG. 9) in its circumferential wall extending the full length thereof, through which stationary and movable gripping jaws 442 and 444, respectively are exposed. The stationary jaw 442 comprises a backing bar 446 within and extending the full length of the drum 410 adjacent the edge of the opening 440 that trails during rotation of the drum. A plurality of spaced-apart fingers 448 project forward from the backing bar 446, i.e., project from the backing bar toward the edge of the opening 440 that leads during rotation of the drum.

The movable jaw 444 likewise comprises a backing bar 450 within the drum 410. The backing bar 450, however, is of slightly greater length than the drum and is provided with a plurality of fingers 452 projecting therefrom in the opposite direction from that in which the drum 410 rotates. The backing bar 450 of the movable jaw 444 is carried by two arms 460 (FIG. 9) and 460a (FIG. 11), respectively, each of which is pivotally mounted upon one of the heads 415 of the drum 410 by a pivot pin 462. The arm 460a (FIG. 11) is mounted on the outer surface of its associated drum head 415 and is formed with a lateral extension on the outer end of which a cam follower roller 466 is rotatably mounted. This roller 466 is engaged within a cam groove 468 of a face cam 470 (FIGS. 1, 7 and 11) which is affixed as by a key 472 to the shaft 474 which bears the weight of the collecting drum 410. It should be noted, however, that the drum 410 is free to rotate about the shaft 474.

Throughout the major portion of its angular extent the cam groove 468 is at constant radial distance from the axis of the shaft 474. It is provided with a rise 476, however, i.e., a short section at somewhat greater radial distance from the axis of the shaft 474, and throughout the period that the cam follower roller 466 is within the rise portion 476 of the groove 468 the movable jaw 444 is held in its open position as illustrated in FIGS. 8, 9, 11 and 16. However, throughout the time that the cam follower roller 466 is within the portion of the groove 468 of lesser radius the movable jaw 444 is held with its fingers 452 in clamping relation with the fingers 448 of the fixed jaw 442 as illustrated in FIGS. 13–15.

The shaft 474 is suitably journaled in the frame extensions 432 and 434 and is provided with means for turning it a few degrees to rotate the disc cam 470 between two alternative operating positions. In the first position of the disc cam 470 the movable jaw 444 of the collecting drum 410 is caused to open in time for the leading edge of a bag being advanced by the belts 426 toward the drum 410 to enter between the fingers 452 of the movable jaw and the fingers 448 of the stationary jaw 442, it being understood that when the movable jaw is in its open position the fingers 452 of the movable jaw project radially outward slightly beyond the belts 426, i.e., to positions below the belts 426 and, consequently, well below the leading edge of the bag that is pressed against the circumference of the drum by the upper surface of the belts 426, as is best understood by reference to FIG. 9.

Just before the movable jaw 444 is rotated beyond the place where the belts 426 become straight and project tangentially from the circumference of the drum 410 the cam follower roller 466 passes out of the rise 476, thus closing the movable jaw 444 and causing the bag to be firmly gripped between the movable and the fixed jaws 444 and 442, respectively, before the leading edge of the bag is permitted to depart from the circumference of the drum 410. Therefore, as the drum 410 continues to rotate, it carries the bag on around with it and when the jaw 444 again approaches the place of tangency of the belts 426 with the circumference of the drum, the jaw 444 opens, permitting the next succeeding bag also to enter between the fingers 452 of the movable jaw and the fingers 448 of the fixed jaw so that the second bag likewise is clamped between the two jaws before it is given an opportunity to depart from the circular orbit in which it is then being carried by the drum.

This operation of the collecting drum 410 to collect bags with their leading edges gripped between the movable and fixed jaws 444 and 442, respectively, is repeated a predetermined number of times so as to collect the desired number of bags before the group of bags is released for passage on beyond the collecting drum 410. In the exemplary machine 20 illustrated, the collecting operation is twice repeated, i.e., it occurs three times so as to collect three successive bags and to carry them around the drum. As the jaw 444 approaches the belts 426 for the fourth time, however, the disc cam 470 is rotated a few degrees in the direction of drum rotation so that the action of the cam follower roller 466 to open the jaw 444 is deferred until it is too late for the leading edge of the fourth bag to enter between the movable and fixed jaws 444 and 442, respectively. Moreover, the action of the cam follower 466 in closing the movable jaw 444 is likewise deferred until after the jaws 442 and 444 have passed beyond the place where the belts 426 depart from the circumference of the drum 410, thus permitting the four collected bags to travel in a straight tangential line from the circumference of the drum 410, in which movement they are guided by the belts 426 until they reach the idler roller 428.

The mechanism for thus shifting the disc cam 470 between the two described operating positions comprises a crank arm 490 (FIGS. 1, 7 and 9) fixed to the end of the shaft 474 opposite that to which the disc cam 470 is attached. A cam follower roller 492 (FIG. 9) is rotatably mounted upon the crank arm 490 for free rotation about an axis spaced radially from the axis of the shaft 474. The roller 492 is engaged within a cam groove 494 (FIG. 9) of a disc cam 496 (FIGS. 7 and 10) which is secured to a stub shaft 498 (FIG. 10) suitably journaled upon and projecting laterally outward from the frame extension 432. The stub shaft 498 likewise carries a sprocket 500 which is driven by means of a chain 502 from a sprocket 504 rigid with the shaft 506 of the transverse sealing drum 24, it being understood that the shaft 506 is rigidly secured to the drum 24, and that both the drum 24 and shaft 506 are rotated by the spur gear 111 (FIG. 2) rigidly secured to the countershaft 56, as hereinbefore mentioned.

The parts are so proportioned that the disc cam 496 makes one complete revolution for each full revolution of the sealing drum 24, and, consequently, one complete revolution for each four full turns of the collecting drum 410.

The cam groove 494 of the disc cam 496 is at constant radial distance from the axis of its supporting stub shaft 498 throughout the major portion of its angular extent but is provided with a rise portion 508 of short angular extent and disposed at a greater radial distance from the axis of the stub shaft 498. So long as the follower roller 492 is within the part 510 of the cam groove 498 of lesser radius, the crank arm 490 remains stationary, holding the jaw-operating disc cam 470 in that position in which bags are permitted to enter between the jaws 442 and 444. However, when the shifting cam 498 turns so as to dispose the follower roller 492 in the rise portion 508, the crank arm 490 is caused to turn clockwise as viewed in FIG. 9, far enough to turn the jaw actuating disc cam 470 to its alternative position, i.e., the position in which the collected group of bags is permitted to depart from the circumference of the drum 410.

It will be understood from the above description that when a group of four bags have thus been collected by the collecting drum 410 the leading edge of one of the bags of the group will be disposed radially outward from the fingers 452 of the movable jaw 444 and that the leading edges of the other three bags will be disposed radially inward of the fingers 452. As a consequence, a stripper mechanism 520 (FIG. 9) is provided to snap the leading edges of the three bags outward past the fingers 452 to permit them to deviate from the circular orbit through which they were previously carried by the rotating drum 410. The stripper mechanism 520 is arranged within the collecting drum 410 and includes a support rod 522 secured at its ends to the heads 415 of the drum 410 and extending the full length of the drum therebetween. A pair of parallel levers 524, one of which is shown in FIG. 9, are pivoted upon the support rod 522, one adjacent each of the drum heads 415. A bar 526 interconnects the two levers 524, being rigidly secured thereto adjacent the outer ends of the levers. A plurality of stripper fingers 528 are carried by the bar 526 in positions to be projected through the opening 440 in the circumferential wall of the drum 410 when the levers 524 are pivoted in a counterclockwise direction as viewed in FIG. 9, from the position in which one of them is illustrated in that figure. Moreover, the stripper fingers 528 are so spaced apart and are so related to the fingers 452 of the movable jaw 444 that when the fingers 528 are thus projected through the opening 440 one stripper finger 528 passes between each two adjacent fingers 452 of the movable jaw 444 and thus positively snaps the entrapped bags radially outward beyond the fingers 452, releasing them to be advanced along the straight horizontal portions of the belts 426.

One end of the bar 526 projects beyond the support lever 524 at the corresponding end of the row of stripper fingers and is engaged by one end 530 of a torsion spring 532 that encircles the support rod 522. The other end 534 of the spring 532 engages an abutment pin 536 rigid with and projecting laterally from an operating lever 538 that is mounted for free rotary movement upon the support rod 522 alongside the proximate lever 524. Adjacent the operating lever 538 a stationary disc cam 540 is mounted, and its peripheral edge is engaged by a cam follower roller 542 carried by the operating lever 538. The entire stripper unit 543 consisting of the operating lever 538, and two parallel levers 524, the bar 526 that connects the two parallel levers 524, and the group of stripper fingers 528 is constantly urged toward the inner, inoperative position illustrated in FIG. 9, by means of a coil spring 544 that is under tension between a pin 546 rigid with the operating lever 538 and a screw 548 carried by one of three stabolts 550 that rigidly interconnects the two heads 415 of the drum 410. Thus, the spring 544 holds the follower roller 542 against the periphery of the cam 540, but yields as rotation of the drum 410 causes the follower roller 542 to ascend the rise 551 of the cam 540.

The abutment pin 536 against which the end 534 of the spring 532 bears, projects laterally from the operating lever 538 and into a hole 552 in the adjacent stripper finger support lever 524. The hole 552 is larger than the cross-sectional area of the abutment pin 536 and consequently if outward radial movement of the stripper fingers 528 is interrupted when the stripper unit 543 is turned counterclockwise as viewed in FIG. 9 by the follower roller 542 ascending the cam rise 551, such rotary movement of the support levers 524 and stripper fingers 528 will terminate although the operating lever 538 will continue to swing counterclockwise, with the abutment pin 536 moving away from the edge of the hole 552 against the urge of the spring 532, until the cam follower roller 542 reaches the crest of the cam rise 551.

The cam 540 is stationary, being fixedly mounted within the drum 410 by means of a sleeve 560 (FIG. 9) to which the cam 540 is rigidly secured by a plurality of screws 562. The sleeve 560 extends through the adjacent drum head 415 and is rigidly secured to a plate 564 (FIG. 7), which is mounted upon and rigidly secured to the frame extension 432 as by a cap screw 566 or other suitable fastener. The associated drum head 415 rotates freely around the stationary sleeve 560 which may, therefore, serve as a bushing that provides the journal for the drum head, or, alternatively, suitable anti-friction bearings (not shown) may be interposed between the sleeve 560 and the associated drum head 415.

FIGS. 12–16, inclusive, illustrate the manner of operation of the bag gripping jaws 442 and 444 of the collecting drum 410 and of the stripper mechanism 520. As the first bag B-1 of four successive bags approaches the collecting drum 410 on the belts 426, the cam follower roller 466 (FIG. 11) encounters the rise 476 of the cam groove 468 of the face cam 470, pushing the roller 466 radially outward and causing the movable jaw 444 to swing to its open position as indicated in FIG. 11, thereby leaving a gap into which the leading end of the bag B-1 enters. Briefly thereafter during the continued rotation of the drum 410 and continued advance of the bag B-1, the cam follower roller 466 encounters the return slope or "fall" 477 of the cam groove 468, whereupon the movable jaw 444 is returned to its clamping position with a leading end of the bag B-1 gripped between the jaws 442 and 444 as shown in FIG. 13.

When the drum 410 has turned some 10 or 15° beyond the FIG. 12 position the cam follower roller 542 on the operating lever 538 of the stripper mechanism 520 encounters the rise 551 of the cam 540 and as the drum 410 continues to rotate the cam follower roller 542 is forced radially outward causing the unit 543 of the stripper mechanism 520 to swing radially outward about the support rod 522. Before the cam follower 542 reaches the crest of the rise 551, the outer ends of the stripper fingers 528 encounter the bag B-1 so closely adjacent the leading end thereof that continued outward movement of the fingers 528 is arrested by the fingers 452 of the movable jaw 444 as shown in FIGURE 13. In view of the fact that the abutment pin 536 engages the adjacent stripper finger support lever 524 only within the relatively large hole 552, the actuating lever 538 is permitted to continue its outward movement until its cam follower 542 reaches and passes over the crest of the cam rise 551 without corresponding outward movement of the stripper fingers 528, as is likewise shown in FIGURE 13.

Consequently, as the drum 410 continues to rotate it carries with it the bag B-1 so that the bag is wrapped upon the surface of the rotating collecting drum 410 and follows a circular orbit corresponding to the circumference of the drum.

This operation is repeated as the next succeeding bag B-2 approaches the drum 410 and is grasped by the jaws 442 and 444 so that the bag B-2 likewise is caused to wrap itself upon the outer surface of the bag B-1 and both bags B-1 and B-2 follow the circular orbit in superimposed relationship upon the circumference of the drum 410. The operation is repeated again with relation to the next succeeding bag B-3 as indicated in FIGS. 14 and 15. However, FIG. 15 shows the apparatus shortly after the fourth cycle of operation of the rotating collecting drum 410 has commenced.

Just before the beginning of the fourth cycle, the face cam 470 is rotated clockwise as viewed in FIG. 11 from the position in which it is illustrated in that figure by the cooperative action of the cam follower roller 492 (FIG. 9) and the cam groove 508, as hereinabove described. Consequently, the leading end of the fourth bag B-4 reaches the drum 410 and the movable jaw 444 before the latter is moved to its open position and will therefore be caused to overlie the fingers 452, i.e., will be disposed radially outward of the fingers 452 as shown in FIG. 15. Shortly thereafter the cam follower roller 542 (FIG. 9) encounters and is moved radially outward by the cam rise 551 and the stripper mechanism 520 is actuated thereby. At this time, however, the cam follower roller 466 (FIG. 11) will not have reached the return slope 477 of the cam groove 468 because of the advanced position then occupied by the face cam 470. Therefore, the fingers 452 (FIG. 9) of the movable jaw 444 will be withdrawn from the path of outward movement of the stripper fingers 528 so that as the cam follower 542 achieves the crest of the cam rise 551 the stripper fingers 528 will reach the outer limit of their movement as shown in FIG. 16, snapping the leading ends of the bags B-1, B-2 and B-3 outward past the fingers 452 causing them to overlie the leading end of the bag B-4. Thus, the entire group of bags B-1, B-2, B-3, and B-4 will be free to digress from the circular orbit theretofore traveled by the bags B-1, B-2, and B-3 and all four bags will depart from the drum 410 along the straight, horizontal portions of the belts 426.

The group of four bags is advanced by the belts 426 onto an auxiliary series of spaced parallel belts 580 (FIGS. 8 and 9) which are also trained around the roller 428. Since the roller 428 is rotated by means of the belts 426 the roller 428 likewise serves as a means for driving the belts 580. One of the belts 580 is disposed between each two adjacent belts 426 where they are trained around the roller 428. The belts 580 are likewise trained around another idler roller 582 which is rotatably mounted on a shaft 584 which is mounted in the frame of the machine similarly to the shaft 430 of the roller 428.

The advancing group of four bags is held down on the auxiliary belts 580 by an overhead series of belts 586, each of which is trained around a pulley 588 carried by a bracket 590 adjustably mounted upon a transverse rod 592 and adapted to be clamped in adjusted position thereon as by a cap screw 594 as clearly shown in FIG. 9. All of the belts 586 are trained around a driving roller 596 (FIGS. 7 and 8) which is driven from the gear 414 of the collecting drum 410 by means of rigidly interconnected gears 597 and 598, a driven gear 600 secured to a shaft 602, an idler gear 604, and a driven gear 605 (FIG. 7) rigid with the roller 596. The gears 597 and 598 are rotatable upon a stub shaft 606, and the idler gear 604 is rotatable upon a stub shaft 608, both stub shafts 606 and 608 being rigid with and projecting laterally from the frame extension 432, whereas the transverse rod 592, the shaft 602, and the shaft 610 of the driving roller 596 are carried by and extend between the two frame extensions 432 and 434.

In addition to the gear 600, the shaft 602 carries a plurality of spaced-apart discs or wheels 616, each of which is of such radius that its peripheral edge is disposed between two adjacent ones of the idler rollers 582 on which the belts 580 are trained, as best shown in FIG. 9. Consequently, as a group four bags approaches the discharge end of the auxiliary belts 580, the group is corrugated in a series of alternate ridges and valleys which impart to the group of bags sufficient longitudinal rigidity to hold the group of bags relatively straight as their leading ends advance off the belts 580.

The hereinbefore mentioned discharge conveyor 28 (FIGS. 1, 7 and 8) extends out from under the belts 580 and comprises a transversely flat, relatively wide belt 622 trained around a driving roller 624 rotatably mounted in the frame of the machine below the belts 580, and around an idler roller 620 (FIG. 1) journaled on and extending between frame extensions 628 and 630, respectively, at the discharge end of the machine 20.

The driving roller 624 (FIG. 8) is driven intermittently and at quite slow speed by the hereinbefore mentioned idler gear 412 whose shaft 640 (FIGS. 8 and 10) is journaled in and extends through the frame extension 432 to receive on its outer end a bevel gear 642 (FIG. 10) which is enmeshed with a driven bevel gear 644 carried by a shaft (not shown) which is journaled in brackets 646 and 648 secured to and projecting outward from the outer face of the frame extension 432. This shaft carries a driving worm 650 enmeshed in driving relation with a worm wheel 652 which is carried by a shaft 654 journaled in and extending through the frame extensions 432 and 434.

On the opposite side of the frame extension 432 from the worm wheel 652, the shaft 654 carries a disc 656 (FIG. 8) having in its peripheral edge a notch 658 of approximately 15° angular extent. Also rigidly secured to the shaft 654 is a second disc 660 of such size that throughout the major portion of its angular extent, the periphery of the disc 660 is of lesser radius than the bottom of the notch 658. However, at that segment of the second disc 660 which is in alignment with the notch 658, the second disc 660 is provided with gear teeth 662.

A stub shaft 664 journaled on the frame extension 432 carries a disc 666 in planar alignment with the disc 656 and having three arcuate notches 668 therein, each of which has curvature complementary to that of the periphery of the disc 656. Throughout the time that any portion of the periphery of the disc 656 except the notch 658 is adjacent the disc 666 the periphery of the former fits within and slides relatively to one of the notches 668, thus holding the disc 666 from rotating. Secured to the disc 666 in coaxial relation therewith is a gear 670 whose teeth are adapted to be engaged by the teeth 662 of the disc 660 whenever the notch 658 of the disc 656 turns to its position closest to the disc 666. There being three notches 668 in the disc 666, it becomes apparent that the disc 666 and the gear 670 will be caused to turn ⅓ of a revolution each time the discs 656 and 658 experience one full turn.

An idler gear 672 is suitably journaled upon the frame extension 432 and is enmeshed with both the gear 670 and with a gear (not shown) rigid with the shaft 674 of the driving roller 624 of the discharge conveyor 28. Thus it may be seen that the discharge conveyor 28 is actuated to move the upper run of its belt 622 a short distance toward the discharge end of the machine 20 each time a predetermined number of groups of bags are discharged from the belts 580 and 586.

The stacking mechanism also includes a gate mechanism 680 (FIGS. 1, 7 and 8) whose function is to intercept the successive groups of bags as they are discharged from the belts 580 and 586 onto the discharge belt 622. The gate mechanism 680 comprises a plurality of horizontally spaced vertical rods 682 rigid with, and projecting downward from, a horizontal support bar 684 which is carried by a crank arm 686 and which projects laterally therefrom over the discharge belt 622. The crank arm 686 is rigid with a shaft 688 that is rotatably supported by an upward extension 690 of a box frame 692 that is slidable longitudinally of the discharge conveyor 28 between the inwardly extending flanges 694 of one of two channel members 696 which constitute the side frame members of the discharge conveyor 28. The box frame 692 is adapted to be releasably clamped in selected position of longitudinal adjustment upon the associated channel member 696 by means of two knobs 698 (one of which is shown in FIG. 7) each of which is threaded upon a stud (not shown) rigid with the box frame 692 and projecting laterally outward therefrom through a longitudinal slot 700 (FIG. 8) in the web of the channel member 696. Each of the two locking knobs 698 is knurled as indicated at 702 to facilitate manipulation thereof without necessitating the use of a wrench.

The shaft 688 which carries the crank arm 686 also carries a disc 704 (FIG. 8) whose circumference is covered by a strip 706 of suitable friction material.

The shaft 688 is adapted to be turned periodically so as to lift the rods 682 of the gate mechanism 680 each time a predetermined number of groups of bags have been intercepted by the rods 682 and thus caused to drop in stacked relation upon the discharge conveyor belt 622. The gate lifting means cooperates with the disc 704 and comprises a shaft 710 (FIG. 8) journaled in the box frame 692 and extending transversely thereof. To the shaft 710 an arm 712 is rigidly secured projecting radially therefrom. The outer end of the arm 712 is formed in an arc whose center lies in the axis of the shaft 710. Moreover, the arm 712 lies in planar alignment with the disc 704 and is of such length that when the shaft 710 is turned so that the arm 712 projects toward the disc 704 the outer, arcuate end of the arm makes frictional engagement with the outer surface of the friction strip 706 and thus, as the shaft 710 continues to turn, imparts rotary movement to the shaft 688.

The means for turning the shaft 710 comprises a spiral gear 714 rigid therewith and enmeshed with a companion spiral gear 716 which is slidable upon and is connected by means of feather key (not shown) to a longitudinally extending shaft 718 which is journaled adjacent its ends in brackets 720 secured to the inner face of the frame extension 630. The shaft 718 is likewise journaled in brackets 722 carried by the box frame 692 and slidable along the shaft 718 when the box frame 692 is shifted longitudinally of the discharge conveyor 28. The shaft 718 has a bevel gear 724 affixed thereto which is in meshing engagement with a companion bevel gear 726 secured to the shaft 654 adjacent the opposite side of the machine from the discs 658 and 660.

For each full turn of the shaft 654 and the discs 658 and 660, advancing the discharge conveyor belt 622 a short distance as hereinabove explained, the shaft 714 will likewise be turned through one complete revolution. Therefore, during the period that the desired number of groups of bags are collecting behind the gate mechanism 680, the discharge conveyor belt 622 remains motionless and the gate mechanism 680 remains in bag intercepting position as illustrated in FIG. 8. However, the arm 712 is so related to the discs 658 and 660 that as said discs begin to rotate the shaft 714 immediately after the desired number of groups of bags have been collected, the arm 712 comes into engagement with the friction strip 706 on the disc 704 and, while the discharge conveyor belt continues to be advanced a distance determined by the peripheral extent of the teeth 662 of the disc 660, the arm 712 turns the disc 704 and shaft 688 far enough to lift the rods 682 of the gate mechanism 680 above the level of the stack of bags that have collected upon the belt 622 and thereby permit the pile of bags to advance until at least their leading edges have passed the rods 682. When the arm 712 passes out of engagement with the friction strip 706 of the disc 704 the rods 682 will gravitate back to their position illustrated in FIG. 8 and thus be conditioned to intercept the next group of bags to be discharged from the belts 580 and 586.

A pair of laterally-spaced, longitudinally extending belts 740 and 742 (FIGS. 1, 7 and 8) are provided above the discharge conveyor 622 to provide lateral support for the stacks of bags as they accumulate behind the gate mechanism 680 and as they are advanced upon the conveyor belt 622 after the gate mechanism 680 has been actuated to release them. Each of the belts 740 and 742 is trained around two pulleys 744 and 746 (FIG. 8) which are disposed with their axes vertical and which are spaced apart longitudinally of the discharge conveyor 28. The pulley 744 of each belt 740, 742 is rotatable upon a vertical shaft 748 (FIG. 8) rigid with and extending downward from a block 750 that is carried by and is slidable along a transversely extending rod 752 (FIGS. 7 and 8) whose ends are rigidly secured to posts 754 (FIG. 7) upstanding from the channel-shaped conveyor side members 696. The parts are so arranged that the transverse rod 752 supports the two pulleys 744 just forward of the forwardmost position of the box frame 692 of the gate mechanism 680 as best shown in FIG. 8.

Each of the rear pulleys 746 of the two belts 740 and 742, respectively, is rigidly secured to a vertical shaft 760 (FIG. 8) whose upper end extends through the web or bight portion (not shown) of a U-shaped bracket 761 (FIGS. 7 and 8) and between the legs 762 thereof where it carries a bevel gear 764 rigidly secured thereto. Each of the two bevel gears 764 is enmeshed with a companion bevel gear 766 which is slidable axially upon a drive shaft 768 disposed above the conveyor belt 622 in horizontal alignment with the transverse rod 752. The drive shaft 768 is journaled in two posts 770, each of which is rigid with, and rises from, one of the channel-shaped conveyor frame side members 696. The drive shaft 768 extends through and is free to rotate with respect to all four of the bracket legs 762. Moreover, these brackets 761 are free to slide axially of the drive shaft 768.

Thus it may be seen that the transverse spacing between the belts 740 and 742 is variable by sliding the blocks 750 along the transverse rod 752 and by similarly sliding the bevel gears 766 and the brackets 761 within which they are disposed axially along the drive shaft 768.

When the belts 740 and 742 have thus been adjusted to make the spacing between their inner runs substantially correspond to the width of the bags to be produced, the blocks 750 should be anchored in their adjusted position upon the transverse rod 752 by set screws 772 which are provided for that purpose. The bevel gears 766 are likewise provided with set screws 774 which not only retain the bevel gears and their associated parts in selected position of adjustment axially along the drive shaft 768 but they also affix the bevel gears 766 to the drive shaft 768 so as to be rotated thereby.

The shaft 768 is driven by a chain 780 (FIGS. 7, 8 and 10) trained around a sprocket 782 which is secured to the shaft 768 and around a sprocket 784 (FIG. 10) rotatable upon a stub shaft 786 secured to and projecting laterally outward from the outer face of the frame extension 432. The stub shaft 786 also carries a driven gear 787 (FIG. 7) which is enmeshed with a gear 788 which is rigid with an end of the shaft 674 of the roller 624 (FIG. 8) whereby the discharge conveyor belt 622 is driven.

It is evident, therefore, that each time the horizontal discharge conveyor belt 622 is advanced, the vertical belts 740 and 742 are likewise advanced. The parts are so proportioned and arranged that the inner runs of the belts 740 and 742 move in the same direction and at the same speed as the upper run of the horizontal discharge conveyor belt 622.

As each successive group of bags emerges from between the belts 580 and 586 (FIG. 8) they drop onto the horizontal discharge conveyor belt 622 between the inner runs of the two vertical belts 740 and 742. Thus the belts 740 and 742 provide lateral guides for the bags as they accumulate in stacked relation upon the belt 622 behind the gate mechanism 680. In this manner each stack of accumulated bags is retained in neat, orderly arrangement, which arrangement is retained when the gate mechanism 680 releases each accumulated stack inasmuch as the vertical belts 740 and 742 are advanced simultaneously and coextensively with advance of the horizontal belt 622.

As the stacks of bags are thus advanced on the discharge conveyor belt 622 the successive stacks will usually be in overlapping relation inasmuch as under most circumstances the length of the bags being produced will be greater than the distance that the belts 622, 740 and 742 are advanced during each actuation thereof. Nevertheless the stacks will be clearly defined and can readily be removed by an attendant from the discharge conveyor belt 622 without permitting any of the bags of any one pile to become displaced from that pile and, therefore, without disturbing the count of bags within each pile.

While a particular embodiment of the present invention has been shown and described, it will be understood that the apparatus is capable of modification and variation without departing from the principles of the invention and that the scope of the invention should be limited only by the scope and proper interpretation of the claims appended hereto.

The invention having thus been described what is believed to be new and desired to be protected by Letters Patent is:

1. A machine for forming bags from a strip of bag stock comprising feeding means for advancing the strip of bag stock within the machine, means arranged to receive the advancing strip of bag stock from the feeding means and to weaken the strip in transverse lines spaced apart to define bag lengths of the bag stock, a series of transversely spaced strip guiding means arranged for advancement of the strip from said weakening means, and a pull-apart mechanism mounted adjacent said guiding means in position to extend therebetween and into engagement with a part of the advancing strip, said pull-apart mechanism being operable to accelerate advancement of said part to detach the particular bag length of stock engaged thereby from the strip of bag stock.

2. In a bag making machine, the combination of a mechanism for transferring bag lengths of sheet material bag stock from a device that weakens a continuous strip of the bag stock in transverse lines spaced apart a distance corresponding to the length of the bags to be made, said transfer mechanism comprising two opposed series of transversely spaced endless belts arranged with runs of the belts of each series adjacent and parallel to corresponding runs of the belts of the other series in position for advancement therebetween of the transversely weakened strip, means for driving said belts, and a pull-apart mechanism operable through the spaces between said belts to engage and accelerate a leading part of the strip during engagement of said part by said transfer means to detach the leading bag length of bag stock from the remainder of the strip.

3. A machine for separating sheets from a strip of sheet stock comprising feeding means for continuously advancing the strip of sheet stock at a constant rate within the machine, means arranged to receive the advancing strip of sheet stock from the feeding means and to weaken the strip in spaced apart transverse lines, two opposed series of transversely spaced strip guiding means arranged for continuous advancement of the strip from said weakening means, a pull-apart mechanism operable through the spaces between said transversely spaced guiding means and engageable with a part of the advancing strip and operable to accelerate advancement of said part, and a hold-back mechanism engageable with another part of the strip spaced from the part engaged by the pull-apart mechanism a distance as great as the spacing of said transverse lines, both of said parts of the strip being within the guiding means when the pull-apart mechanism accelerates advancement of said part engageable thereby.

4. In a bag making machine, the combination of a mechanism for transferring bag lengths of sheet material bag stock from a device that weakens a continuous strip of the bag stock in transverse lines spaced apart a distance corresponding to the length of the bags to be made, said transfer mechanism comprising two opposed endless belts arranged with runs of the two belts adjacent and parallel to each other in position for advancement therebetween of the transversely weakened strip, means for driving said belts, a pull-apart mechanism operable through the respective planes of said runs to engage and accelerate a leading part of the strip while the leading part is engaged by said transfer mechanism to detach the leading bag length of bag stock from the remainder of the strip, and a hold-back mechanism operable through the planes of said runs to engage and restrict advancement of a part of the strip of bag stock corresponding to the next successive the length during operation of said pull-apart mechanism.

5. In a bag making machine, the combination of a mechanism for transferring bag lengths of sheet material bag stock from a device that weakens a continuous strip of the bag stock in transverse lines spaced apart a distance corresponding to the length of the bags to be made, said transfer mechanism comprising two opposed series of endless belts arranged with a run of each belt of one series adjacent and parallel to a run of one of the belts of the other series in position for advancement therebetween of the transversely weakened strip, means for driving said belts, and a pull-apart mechanism operable between the belts of both series to engage and accelerate a leading part of the strip to detach the leading bag length of bag stock from the remainder of the strip.

6. In a bag making machine, the combination of a mechanism for transferring bag lengths of sheet material bag stock from a device that weakens a continuous strip of the bag stock in transverse lines spaced apart a distance corresponding to the length of the bags to be made, said transfer mechanism comprising two opposed series of endless belts arranged with a run of each belt of one series adjacent and parallel to a run of a belt of the other series in position for advancement therebetween of the transversely weakened strip, means for driving of the said belts, a hold-back mechanism operable between the belts of one series and between the belts of the other series to engage and restrict advancement of a part of the strip of bag stock spaced more than one bag length from the leading end of the strip, and a pull-apart mechanism operable between the belts of one series and between the belts of the other series to engage and accelerate a part of the strip corresponding to the leading bag length to detach the leading bag length of bag stock from the remainder of the strip.

7. In a bag making machine, the combination of a mechanism for transferring bag lengths of sheet material bag stock from a device that weakens a continuous strip of the bag stock in spaced apart transverse lines to gripping jaws movable in a path spaced from the weakening means, said transfer mechanism comprising two opposed endless belts arranged with runs of the two belts adjacent and parallel to each other in position for advancement therebetween of the transversely weakened strip, means for driving said belts, and a pull-apart mechanism operable through the respective planes of said runs to progressively engage and accelerate a leading part of the strip to detach the leading bag length of bag stock from the remainder of the strip, said pull-apart mechanism being operable to exert a drag upon a trailing part of a bag length engaged thereby to decelerate the bag length after a leading part of the bag length has progressed past the pull-apart mechanism whereby the inertia of the advancing leading part is caused to impose tension upon the leading part to retain the same substantially flat.

8. In a bag making machine, the combination of gripping jaws mounted for movement along a predetermined path, and mechanism for conveying a length of sheet material to said gripping jaws comprising two belts having opposed, parallel runs arranged in planes intersecting said path and adapted to receive the length of sheet material therebetween, means for driving said belts to move said runs thereof toward said path, opposed rotary members mounted for rotation about axes on opposite sides of said runs and having peripheral surfaces projecting through said planes into position to grip the length of sheet material therebetween, and means for rotating said rotary members at a predetermined peripheral speed when they initially grip a leading part of the length of sheet material and for decreasing the rate of rotation of the rotary members while they engage a trailing part of the length of sheet material to exert a drag upon said trailing part and thereby cause the inertia of said leading part to maintain the leading part in tension as it approaches said path.

9. In a bag making machine, the combination of gripping jaws mounted for movement according to a predetermined path, and mechanism for conveying a length of sheet material to said gripping jaws comprising two belts having opposed parallel runs arranged in planes intersecting said path and adapted to receive the length of sheet material therebetween, means for driving said belts to move said runs thereof toward said path, opposed rotary members mounted for rotation about axes on opposite sides of said runs and having peripheral surfaces projecting through said planes into position to grip the length of sheet material therebetween, means for rotating said rotary members at a predetermined peripheral speed when they grip a leading part of the length of sheet material and for decreasing the rate of rotation of the rotary members while they engage a trailing part of the length of sheet material to exert a drag upon said trailing part and thereby cause the inertia of said leading part to maintain the leading part in tension as it approaches said path, and means for moving said gripping jaws in timed relation to said rotating means to dispose the gripping jaws in position for entry therebetween of the leading edge of the length of sheet material subsequently to emergence of the leading edge from between said belts.

10. In a bag making machine, the combination of gripping jaws mounted for movement along a predetermined path, and mechanism for conveying to said gripping jaws lengths of sheet material severed from a parent strip of the sheet material having transverse lines of perforations therein, comprising two belts having opposed parallel runs arranged in planes intersecting said path and adapted to receive the length of sheet material therebetween, means for driving said belts to move said runs thereof toward said path, opposed rotary members mounted for rotation about axes on opposite sides of said runs and having peripheral surfaces projecting through said planes into position to grip the length of sheet material therebetween, and means for rotating said rotary members at a peripheral speed substantially the same as the linear speed of the belts when they grip a leading part of the strip of sheet material, for increasing the rate of rotation of said rotary member until they engage a succeeding part of said strip to pull from said parent strip the section thereof in advance of one of said lines of perforations therein, and for decreasing the rate of rotation of the rotary members while they engage a trailing part of said section of sheet material to exert a drag upon said trailing part and thereby cause the inertia of said section to maintain the leading part thereof in tension as it approaches said path.

References Cited in the file of this patent

UNITED STATES PATENTS

| | | |
|---|---|---|
| 704,472 | Dear | July 8, 1902 |
| 2,013,086 | Baker | Sept. 3, 1935 |
| 2,129,842 | Holweg | Sept. 13, 1938 |
| 2,191,497 | Potdevin et al. | Feb. 27, 1940 |
| 2,312,729 | Potdevin | Mar. 2, 1943 |
| 2,424,093 | Harred | July 15, 1947 |
| 2,655,842 | Baumgartner | Oct. 20, 1953 |
| 2,780,275 | Rusch et al. | Feb. 5, 1957 |
| 2,800,163 | Rusch | July 23, 1957 |

FOREIGN PATENTS

| | | |
|---|---|---|
| 478,829 | Great Britain | Jan. 26, 1938 |